United States Patent
Massand

(10) Patent No.: US 10,536,408 B2
(45) Date of Patent: Jan. 14, 2020

(54) SYSTEMS AND METHODS FOR DETECTING, REPORTING AND CLEANING METADATA FROM INBOUND ATTACHMENTS

(71) Applicant: LITERA CORPORATION, McLeansville, NC (US)

(72) Inventor: Deepak Massand, McLeansville, NC (US)

(73) Assignee: LITÉRA CORPORATION, Chicago, IL (US)

( * ) Notice: Subject to any disclaimer, the term of this patent is extended or adjusted under 35 U.S.C. 154(b) by 180 days.

(21) Appl. No.: 14/856,285

(22) Filed: Sep. 16, 2015

(65) Prior Publication Data

US 2017/0078234 A1 Mar. 16, 2017

(51) Int. Cl.
*H04L 12/58* (2006.01)

(52) U.S. Cl.
CPC ............ *H04L 51/08* (2013.01); *H04L 51/063* (2013.01); *H04L 51/12* (2013.01); *H04L 51/18* (2013.01)

(58) Field of Classification Search
CPC ....... H04L 51/063; H04L 51/08; H04L 51/12; H04L 51/18
See application file for complete search history.

(56) References Cited

U.S. PATENT DOCUMENTS

| | | |
|---|---|---|
| 3,920,895 A | 11/1975 | Vieri et al. |
| 3,920,896 A | 11/1975 | Bishop et al. |
| 5,008,853 A | 4/1991 | Bly et al. |
| 5,129,082 A | 7/1992 | Tirfing et al. |
| 5,146,552 A | 9/1992 | Cassoria et al. |
| 5,204,947 A | 4/1993 | Bernstein et al. |
| 5,321,505 A | 6/1994 | Leddy |
| 5,341,469 A | 8/1994 | Rossberg et al. |

(Continued)

OTHER PUBLICATIONS

Patent Owner's Preliminary Responses in Case IPR2016-00541 in *DocsCorp LLC v. Litera Technologies LLC*, Case IPR2016-00541 (PTAB May 10, 2016) (59 pages).

(Continued)

*Primary Examiner* — June Y Sison
(74) *Attorney, Agent, or Firm* — Finnegan, Henderson, Farabow, Garrett & Dunner LLP

(57) ABSTRACT

Systems and methods consistent with various disclosed embodiments provide for detecting, reporting, removing and cleaning metadata from inbound email attachments. In one embodiment, a system is disclosed that may be associated with a client device operated by an electronic message recipient. The system may include a memory storing instructions and one or more processors configured to execute the instructions to perform one or more operations. The operations may include intercepting an inbound electronic message sent to the recipient and determining that an electronic document attached to the inbound electronic message includes metadata. The operations may also include creating a modified electronic document by removing at least a portion of the metadata from the attached electronic document, generating a report describing metadata included in the attached electronic document, and generating information for sending the report and the inbound electronic message with the modified electronic document to the client device.

20 Claims, 6 Drawing Sheets

(56) References Cited

U.S. PATENT DOCUMENTS

| | | |
|---|---|---|
| 5,515,491 A | 5/1996 | Bates et al. |
| 5,539,871 A | 7/1996 | Gibson |
| 5,596,700 A | 1/1997 | Darnell et al. |
| 5,596,705 A | 1/1997 | Reimer et al. |
| 5,659,676 A | 8/1997 | Redpath |
| 5,664,208 A | 9/1997 | Pavley et al. |
| 5,669,005 A | 9/1997 | Curbow et al. |
| 5,671,428 A | 9/1997 | Muranaga et al. |
| 5,694,544 A | 12/1997 | Tanigawa et al. |
| 5,706,452 A | 1/1998 | Ivanov |
| 5,706,502 A | 1/1998 | Foley et al. |
| 5,708,826 A | 1/1998 | Ikeda et al. |
| 5,708,845 A | 1/1998 | Wistendahl et al. |
| 5,740,444 A | 4/1998 | Frid-Nielsen |
| 5,752,055 A | 5/1998 | Redpath et al. |
| 5,758,313 A | 5/1998 | Shah et al. |
| 5,761,419 A | 6/1998 | Schwartz et al. |
| 5,761,499 A | 6/1998 | Sonderegger |
| 5,781,732 A | 7/1998 | Adams |
| 5,781,901 A | 7/1998 | Kuzma |
| 5,787,175 A | 7/1998 | Carter |
| 5,799,191 A | 8/1998 | Moriyasu et al. |
| 5,801,702 A | 9/1998 | Dolan et al. |
| 5,809,512 A | 9/1998 | Kato |
| 5,860,073 A | 1/1999 | Ferrel et al. |
| 5,864,870 A | 1/1999 | Guck |
| 5,870,754 A | 2/1999 | Dimitrova et al. |
| 5,878,421 A | 3/1999 | Ferrel et al. |
| 5,890,177 A | 3/1999 | Moody et al. |
| 5,893,126 A | 4/1999 | Drews et al. |
| 5,911,776 A | 6/1999 | Guck |
| 5,931,906 A | 8/1999 | Fidelibus, Jr. et al. |
| 5,937,066 A | 8/1999 | Gennaro et al. |
| 5,938,724 A | 8/1999 | Pommier et al. |
| 5,944,785 A | 8/1999 | Pommier et al. |
| 5,949,413 A | 9/1999 | Lerissa et al. |
| 5,950,214 A | 9/1999 | Rivette et al. |
| 5,956,736 A | 9/1999 | Hanson et al. |
| 5,958,006 A | 9/1999 | Eggleston et al. |
| 5,978,836 A | 11/1999 | Ouchi |
| 5,987,469 A | 11/1999 | Lewis et al. |
| 6,009,462 A | 12/1999 | Birrell et al. |
| 6,014,135 A | 1/2000 | Fernandes |
| 6,029,171 A | 2/2000 | Smiga et al. |
| 6,064,751 A | 5/2000 | Smithies et al. |
| 6,067,551 A | 5/2000 | Brown et al. |
| 6,073,142 A | 6/2000 | Geiger et al. |
| 6,088,709 A | 7/2000 | Watanabe |
| 6,119,147 A | 9/2000 | Toomey et al. |
| 6,158,903 A | 12/2000 | Schaeffer et al. |
| 6,178,431 B1 | 1/2001 | Douglas |
| 6,182,080 B1 | 1/2001 | Clements |
| 6,212,534 B1 | 4/2001 | Lo et al. |
| 6,243,722 B1 | 6/2001 | Day et al. |
| 6,289,460 B1 | 9/2001 | Hajmiragha |
| 6,317,777 B1 | 11/2001 | Skarbo et al. |
| 6,334,141 B1 | 12/2001 | Varma et al. |
| 6,336,134 B1 | 1/2002 | Varma |
| 6,343,313 B1 | 1/2002 | Salesky et al. |
| 6,360,236 B1 | 3/2002 | Khan et al. |
| 6,363,352 B1 | 3/2002 | Dailey et al. |
| 6,411,989 B1 | 6/2002 | Anupam et al. |
| 6,560,637 B1 | 5/2003 | Dunlap et al. |
| 6,590,584 B1 | 7/2003 | Yamaura et al. |
| 6,643,663 B1 | 11/2003 | Dabney et al. |
| 6,681,371 B1 | 1/2004 | Devanbu |
| 6,687,878 B1 | 2/2004 | Eintracht et al. |
| 6,708,172 B1 | 3/2004 | Wong et al. |
| 7,103,915 B2 | 9/2006 | Redlich et al. |
| 7,113,948 B2 | 9/2006 | Jhingan et al. |
| 7,117,210 B2 | 10/2006 | DeSalvo |
| 7,212,814 B2 | 5/2007 | Wilson et al. |
| 7,251,680 B2 | 7/2007 | DeVos |
| 7,424,513 B2 * | 9/2008 | Winjum ............... G06Q 10/107 707/999.202 |
| 7,424,543 B2 | 9/2008 | Rice |
| 7,570,964 B2 | 8/2009 | Maes |
| 7,623,515 B2 | 11/2009 | Breuer et al. |
| 7,640,308 B2 | 12/2009 | Antonoff et al. |
| 7,895,166 B2 | 2/2011 | Foygel et al. |
| 7,895,276 B2 * | 2/2011 | Massand ............... G06Q 10/107 709/204 |
| 8,060,575 B2 * | 11/2011 | Massand ............... G06Q 10/107 709/204 |
| 8,065,424 B2 | 11/2011 | Foresti et al. |
| 8,601,063 B2 | 12/2013 | Slythe |
| 8,977,697 B2 * | 3/2015 | Massand ............... G06Q 10/107 709/204 |
| 9,286,471 B2 | 3/2016 | Qureshi |
| 2001/0037367 A1 | 11/2001 | Iyer |
| 2002/0004908 A1 * | 1/2002 | Galea ................... H04L 63/1416 726/24 |
| 2002/0049786 A1 | 4/2002 | Bibliowicz et al. |
| 2002/0059342 A1 | 5/2002 | Gupta et al. |
| 2002/0059343 A1 | 5/2002 | Kurishima et al. |
| 2002/0065848 A1 | 5/2002 | Walker et al. |
| 2002/0078088 A1 | 6/2002 | Kuruoglu et al. |
| 2002/0085030 A1 | 7/2002 | Ghani |
| 2002/0091741 A1 | 7/2002 | Ferreira et al. |
| 2002/0107886 A1 | 8/2002 | Gentner et al. |
| 2002/0143691 A1 | 10/2002 | Ramaley et al. |
| 2003/0050933 A1 | 3/2003 | DeSalvo |
| 2003/0112273 A1 | 6/2003 | Hadfield et al. |
| 2003/0145017 A1 | 7/2003 | Patton et al. |
| 2003/0158855 A1 | 8/2003 | Farnham et al. |
| 2003/0158905 A1 * | 8/2003 | Petry ................... H04L 51/12 709/206 |
| 2003/0182323 A1 | 9/2003 | Demsky |
| 2003/0197730 A1 | 10/2003 | Kakuta et al. |
| 2004/0034688 A1 | 2/2004 | Dunn |
| 2004/0085354 A1 | 5/2004 | Massand |
| 2004/0203947 A1 | 10/2004 | Moles |
| 2004/0205653 A1 | 10/2004 | Hadfield et al. |
| 2005/0060375 A1 | 3/2005 | Ernest et al. |
| 2006/0069733 A1 | 3/2006 | Antonoff et al. |
| 2006/0089931 A1 | 4/2006 | Giacobbe et al. |
| 2006/0167879 A1 | 7/2006 | Umeki et al. |
| 2006/0253482 A1 | 11/2006 | Zellweger et al. |
| 2007/0016613 A1 * | 1/2007 | Foresti ............... G06Q 10/107 |
| 2007/0061373 A1 | 3/2007 | Kilday |
| 2007/0067397 A1 | 3/2007 | Tran |
| 2007/0143425 A1 | 6/2007 | Kieselbach et al. |
| 2007/0186157 A1 | 8/2007 | Walker et al. |
| 2007/0220607 A1 * | 9/2007 | Sprosts ............... G06Q 10/107 726/24 |
| 2008/0162652 A1 | 7/2008 | True et al. |
| 2008/0183824 A1 | 7/2008 | Chen et al. |
| 2008/0215509 A1 | 9/2008 | Charlton |
| 2008/0256188 A1 * | 10/2008 | Massand ............... G06Q 10/107 709/206 |
| 2008/0280633 A1 | 11/2008 | Agiv |
| 2009/0037407 A1 | 2/2009 | Yang |
| 2011/0125853 A1 | 5/2011 | Weber |
| 2011/0125863 A1 * | 5/2011 | Massand ............... G06Q 10/107 709/206 |
| 2011/0202621 A1 | 8/2011 | Laval |
| 2012/0030772 A1 * | 2/2012 | Massand ............... G06Q 10/107 726/26 |
| 2013/0086692 A1 * | 4/2013 | Massand ............... G06Q 10/107 726/26 |
| 2013/0254528 A1 | 9/2013 | Brown et al. |
| 2014/0019558 A1 | 1/2014 | Pollack |
| 2014/0208193 A1 | 7/2014 | Parmar |
| 2015/0143548 A1 | 5/2015 | Massand |
| 2015/0271117 A1 | 9/2015 | Massand |

OTHER PUBLICATIONS

Patent Owner's Preliminary Responses in Case IPR2016-00542 in *DocsCorp LLC v. Litera Technologies LLC*, Case IPR2016-00541 (59 pages).

(56) References Cited

OTHER PUBLICATIONS

Institution Decision in *DocsCorp LLC* v. *Litera Techs. LLC*, Case No. IPR2016-00541 (22 pages).
Institution Decision in *DocsCorp LLC* v. *Litera Techs. LLC*, Case No. IPR2016-00542 (23 pages).
Patent Owner Response in Case No. IPR2016-00541 (81 pages).
Ex. 2077 (Expert Declaration of John Guyer) in Case No. IPR2016-00541 (192 pages).
Patent Owner Response in *DocsCorp LLC* v. *Litera Techs. LLC*, Case No. IPR2016-00542 (80 pages).
Ex. 2077 (Expert Declaration of John Guyer) in *DocsCorp LLC* v. *Litera Techs. LLC*, Case No. IPR2016-00542 (191 pages).
Ex. 2021 in Case Nos. IPR2016-00541 and IPR2016-00542, Internet Archive webpage, *Information Requests—The Internet Archive's Policy for Responding to Information Requests*, https://archive.org/legal (last accessed Sep. 26, 2016) (2 pages).
Ex. 2022 in Case Nos. IPR2016-00541 and IPR2016-00542, Internet Archive webpage, *Standard Affidavit*, https://archive.org/legal/affidavit.php (last accessed Sep. 26, 2016) (1 page).
Ex. 2023 in Case Nos. IPR2016-00541 and IPR2016-00542, Internet Archive webpage, *Legal Frequently Asked Questions*, https://archive.org/legal/faq.php (last accessed Sep. 26, 2016) (4 pages).
Ex. 2024 in Case Nos. IPR2016-00541 and IPR2016-00542, Internet Archive webpage, https://web.archive.org/web/20070202072717/http:/kklsoftware.com (last accessed Sep. 29, 2016) (1 page).
Ex. 2025 in Case Nos. IPR2016-00541 and IPR2016-00542, Internet Archive webpage, https://web.archive.org/web/20060414015245/http:/kklsoftware.com (last accessed Sep. 29, 2016) (1 page).
Ex. 2026 in Case Nos. IPR2016-00541 and IPR2016-00542, Internet Archive webpage, https://web.archive.org/web/20050405051007/http:/www.kklsoftware.com (last accessed Sep. 29, 2016) (1 page).
Ex. 2027 in Case Nos. IPR2016-00541 and IPR2016-00542, Cross-examination transcript of Christopher Butler, dated Oct. 6, 2016 (53 pages).
Ex. 2028 in Case Nos. IPR2016-00541 and IPR2016-00542, International Legal Technology Association, ILTA's 2006 Technology Survey, Aug. 2006 (24 pages).
Ex. 2029 in Case Nos. IPR2016-00541 and IPR2016-00542, MIT Sloan Alumni webpage bio, *Michael J. Freedman, SB 2001, MNG 2002*, http://mitsloan.mit.edu/alumni/events/iot-series-bios-freedman/ (last accessed Oct. 17, 2016) (2 pages).
Ex. 2030 in Case Nos. IPR2016-00541 and IPR2016-00542, M. Freedman, et al., *SANE: A Protection Architecture for Enterprise Networks* (Aug. 2006) (15 pages).
Ex. 2031 in Case Nos. IPR2016-00541 and IPR2016-00542, M. Freedman, et al., *Shark: Scaling File Servers via Cooperative Caching* (May 2005) (14 pages).
Ex. 2032 in Case Nos. IPR2016-00541 and IPR2016-00542, M. Freedman, et al., *Economic Barriers to the Deployment of Existing Privacy Technologies* (May 2002) (3 pages).
Ex. 2033 in Case Nos. IPR2016-00541 and IPR2016-00542, DocsCorp White Paper, *Metadata Management in 2015 Requires a Rethink* . . . (8 pages).
Ex. 2034 in Case Nos. IPR2016-00541 and IPR2016-00542, DocsCorp, cleanDocs Datasheet (*available at* http://www.docscorp.com/Documents/Product%20datasheets/cleanDocs_datasheet.pdf) (2 pages).
Ex. 2035 in Case Nos. IPR2016-00541 and IPR2016-00542, Declaration of Michael J. Freedman in CBM2013-00025 (20 pages).
Ex. 2036 in Case Nos. IPR2016-00541 and IPR2016-00542, U.S. Appl. No. 11/699,750 (20 pages).
Ex. 2037 in Case Nos. IPR2016-00541 and IPR2016-00542, Webster's New World Computer Dictionary (10th ed. 2003) (excerpts) (6 pages).
Ex. 2038 in Case Nos. IPR2016-00541 and IPR2016-00542, U.S. Department of Labor, Occupational Outlook Handbook 2006-2007 (2006) (excerpts) (6 pages).
Ex. 2039 in Case Nos. IPR2016-00541 and IPR2016-00542, B. Burney, *Software Shootout: Disappearing Data, Metadata Assistant and Workshare Metawall Can Make Metadata a Thing of the Past*, 30 Law Office Computing 41-43 (2003) (5 pages).
Ex. 2040 in Case Nos. IPR2016-00541 and IPR2016-00542, Microsoft Computer Dictionary (5th ed. 2002) (excerpts) (7 pages).
Ex. 2041 in Case Nos. IPR2016-00541 and IPR2016-00542, M. Haider and Networks First, Market Insight Paper, *The Impact of Network Downtime on Businesses Today* (Jul. 2007) (19 pages).
Ex. 2042 in Case Nos. IPR2016-00541 and IPR2016-00542, W. Schmied & K. Miller, MCTS Microsoft® Exchange Server 2007 Configuration Study Guide (2007) (excerpts) (5 pages).
Ex. 2043 in Case Nos. IPR2016-00541 and IPR2016-00542, Microsoft® Exchange Server 2007: Tony Redmond's Guide (2007) (excerpts) (5 pages).
Ex. 2044 in Case Nos. IPR2016-00541 and IPR2016-00542, ZDNet, *Lack of email 'more traumatic than divorce'*, http://www.zdnet.com/article/lack-of-email-more-traumatic-than-divorce/ (Jun. 5, 2003) (last accessed Oct. 30, 2016) (4 pages).
Ex. 2045 in Case Nos. IPR2016-00541 and IPR2016-00542, BBC News, *Loss of e-mail 'worse than divorce'*, http://news.bbc.co.uk/2/hi/technology/3104889.stm (Jul. 29, 2003) (last accessed Oct. 17, 2016) (2 pages).
Ex. 2046 in Case Nos. IPR2016-00541 and IPR2016-00542, C. Luce, *What's the Matter with Metadata?*, The Colorado Lawyer, Official Publication of the Colorado Bar Association (Nov. 2007) (10 pages).
Ex. 2047 in Case Nos. IPR2016-00541 and IPR2016-00542, M. Betts, Computerworld, *The No. 1 Cause of IT Failure: Complexity*, http://www.computerworld.com/article/2550521/enterprise-applications/the-no--1-cause-of-it-failure--complexity.html (Dec. 21, 2009) (last accessed Sep. 29, 2016) (3 pages).
Ex. 2048 in Case Nos. IPR2016-00541 and IPR2016-00542, J. Wortham, *Customers Angered as iPhones Overload AT&T*, New York Times (Sep. 2, 2009), *available at* http://www.nytimes.com/2009/09/03/technology/companies/03att.html (last accessed Sep. 26, 2016) (2 pages).
Ex. 2049 in Case Nos. IPR2016-00541 and IPR2016-00542, D. Chaffey, *Email client popularity*, Smart Insights Marketing Intelligence Ltd. (Jan. 12, 2011), *available at* http://www.smartinsights.com/email-marketing/email-marketing-analytics/most-popular-email-marketing-clients/attachment/email-client-popularity/ (last accessed Sep. 30, 2016) (1 page).
Ex. 2050 in Case Nos. IPR2016-00541 and IPR2016-00542, D. Chaffey, *The most popular email marketing clients?*, Smart Insights Marketing Intelligence Ltd. (Jan. 23, 2014), *available at* http://www.smartinsights.com/email-marketing/email-marketing-analytics/most-popular-email-marketing-clients/ (last accessed Sep. 30, 2016) (7 pages).
Ex. 2051 in Case Nos. IPR2016-00541 and IPR2016-00542, BlackBerry, User Guide: BlackBerry 8100 Smartphone (2008) (283 pages).
Ex. 2052 in Case Nos. IPR2016-00541 and IPR2016-00542, Apple Press Release, *iPhone Premieres This Friday Night at Apple Retail Stores* (Jun. 28, 2007), *available at* http://www.apple.com/pr/library/2007/06/28/iPhone-Premieres-This-Friday-Night-at-Apple-Retail-Stores.html (last accessed Sep. 27, 2016) (3 pages).
Ex. 2053 in Case Nos. IPR2016-00541 and IPR2016-00542, T-Mobile Press Release, *T-Mobile Unveils the T-Mobile G1—the First Phone Powered by Android* (Sep. 23, 2008), *available at* https://newsroom.t-mobile.com/news-and-blogs/t-mobile-unveils-the-t-mobile-g1-the-first-phone-powered-by-android.htm (last accessed Sep. 27, 2016) (3 pages).
Ex. 2054 in Case Nos. IPR2016-00541 and IPR2016-00542, K. German, CNET, *A Brief History of Android Phones* (Aug. 2, 2011), *available at* https://www.cnet.com/news/a-brief-history-of-android-phones/ (last accessed Oct. 30, 2016) (12 pages).
Ex. 2055 in Case Nos. IPR2016-00541 and IPR2016-00542, Open Handset Alliance Press Release, *Industry Leaders Announce Open Platform for Mobile Devices* (Nov. 5, 2007), *available at* http://www.openhandsetalliance.com/press_110507.html (last accessed Oct. 30, 2016) (6 pages).
Ex. 2056 in Case Nos. IPR2016-00541 and IPR2016-00542, S. Kerner, InternetNews.com, *Report: Symbian at a Mobile Loss* (Feb. 10, 2006), *available at* http://www.internetnews.com/wireless/print.php/3584431 (last accessed Sep. 15, 2016) (1 page).

(56) References Cited

OTHER PUBLICATIONS

Ex. 2057 in Case Nos. IPR2016-00541 and IPR2016-00542, BlackBerry User Guide, BlackBerry 7100 and 7130, Version 4.1 (2006) (162 pages).

Ex. 2058 in Case Nos. IPR2016-00541 and IPR2016-00542, S. Segan, PC Magazine Product Review, *RIM BlackBerry 7130c* (Jul. 5, 2006), *available at* http://www.pcmag.com/article2/0,2817,1984923,00.asp (last accessed Oct. 5, 2016) (4 pages).

Ex. 2059 in Case Nos. IPR2016-00541 and IPR2016-00542, BlackBerry Press Release for BlackBerry® Pearl™ 8100™ (Sep. 2006), *available at* http://www.blackberry.com/newsletters/connection/small_business/Sept2006/Sept2006-smbiz-blackberry-pearl.shtml?cp=NLC-30 (last accessed Oct. 5, 2016) (2 pages).

Ex. 2060 in Case Nos. IPR2016-00541 and IPR2016-00542, Verizon News Release for BlackBerry Pearl 8130, *Verizon Wireless Launches the First CDMA-Enabled BlackBerry Pearl* (Oct. 31, 2007), *available at* http://www.verizonwireless.com/news/article/2007/11/pr2007-11-01b.html (last accessed Oct. 5, 2016) (2 pages).

Ex. 2061 in Case Nos. IPR2016-00541 and IPR2016-00542, BlackBerry, User Guide: BlackBerry Pearl 8130 Smartphone (2007) (270 pages).

Ex. 2062 in Case Nos. IPR2016-00541 and IPR2016-00542, C. Albanesius, PC Magazine, *Did AT&T Quietly Improve EDGE Data Rates for iPhone* (Jun. 29, 2007), *available at* http://www.pcmag.com/article2/0,2817,2152744,00.asp (last accessed Oct. 5, 2016) (2 pages).

Ex. 2063 in Case Nos. IPR2016-00541 and IPR2016-00542, K. Komando, USA Today, *Get Online with Laptop Cellular Card* (Feb. 15, 2007), *available at* http://usatoday30.usatoday.com/tech/columnist/kimkomando/2007-02-15-laptop-cellular-card_x.htm (last accessed Oct. 5, 2016) (2 pages).

Ex. 2064 in Case Nos. IPR2016-00541 and IPR2016-00542, U.S. Pat. No. 8,745,084, assigned to DocsCorp Australia, Sydney (AU) (15 pages).

Ex. 2065 in Case Nos. IPR2016-00541 and IPR2016-00542, Microsoft TechNet, *How Terminal Services Works* (Mar. 28, 2003), *available at* https://technet.microsoft.com/en-us/library/cc755399(v=ws.10).aspx (last accessed Oct. 5, 2015) (14 pages).

Ex. 2066 in Case Nos. IPR2016-00541 and IPR2016-00542, Microsoft TechNet, *Remote Desktop Services Overview* (May 7, 2014), *available at* https://technet.microsoft.com/library/hh831447.aspx (last accessed Oct. 5, 2015) (5 pages).

Ex. 2067 in Case Nos. IPR2016-00541 and IPR2016-00542, RFC 2821, Simple Mail Transfer Protocol (Apr. 2001) (74 pages).

Ex. 2068 in Case Nos. IPR2016-00541 and IPR2016-00542, Screenshots from Microsoft Outlook 2016, prepared by John Guyer (3 pages).

Ex. 2069 in Case Nos. IPR2016-00541 and IPR2016-00542, Software Security Solutions, White Paper, *Choosing Anti-Virus Software, A Guide to Selecting the Right Solution for Your Business* (2007) (16 pages).

Ex. 2070 in Case Nos. IPR2016-00541 and IPR2016-00542, Microsoft TechNet, *Managing Global Address Lists* (Jan. 31, 2007), *available at* https://technet.microsoft.com/en-us/library/bb232101(v=exchg.80).aspx (last accessed Oct. 30, 2016) (2 pages).

Ex. 2071 in Case Nos. IPR2016-00541 and IPR2016-00542, Statista, *Global Smartphone Shipments by BlackBerry (RIM) from 2007 to 2013, available at* https://www.statista.com/statistics/263395/rim-smartphones-shipped-worldwide-since-1st-quarter-2007/ (last accessed Oct. 28, 2016) (3 pages).

Ex. 2072 in Case Nos. IPR2016-00541 and IPR2016-00542, BlackBerry Limited, SEC Form 40-F (Mar. 27, 2015) (excerpts) (15 pages).

Ex. 2073 in Case Nos. IPR2016-00541 and IPR2016-00542, Statista, *Global Annual Shipments of Smartphones Using the Android Operating System from 2007 to 2016, available at* https://www.statista.com/statistics/241947/global-shipment-forecast-of-smartphones-using-android-os/ (last accessed Oct. 28, 2016) (3 pages).

Ex. 2074 in Case Nos. IPR2016-00541 and IPR2016-00542, Statista, *Unit Sales of the Apple iPhone Worldwide from 2007 to 2015, available at* https://www.statista.com/statistics/276306/global-apple-iphone-sales-since-fiscal-year-2007/ (last accessed Oct. 28, 2016) (3 pages).

Ex. 2075 in Case Nos. IPR2016-00541 and IPR2016-00542, Mobile Broadband Reviews, *2010 Wireless Broadband Reviews, available at* http://www.mobile-broadband-reviews.com/wireless-broadband-reviews.html (last accessed Oct. 28, 2016) (19 pages).

Ex. 2076 in Case Nos. IPR2016-00541 and IPR2016-00542, D. Andersen, Root Metrics, *Mobile Network Performance in the United States* (Aug. 18, 2015) (47 pages).

Ex. 2078 in Case Nos. IPR2016-00541 and IPR2016-00542, Cross-examination transcript of Michael J. Freedman, dated Oct. 21, 2016 (147 pages).

Ex. 2079 in Case No. IPR2016-00541, U.S. Pat. No. 8,060,575 (11 pages).

Ex. 2079 in Case No. IPR2016-00542, U.S. Pat. No. 7,895,276 (11 pages).

Cross-examination transcript of John Guyer in Case Nos. IPR2016-00541 and IPR2016-00542, dated Jan. 27, 2017 (232 pages).

M. Silver et al., *Plan to Deal with Metadata Issues with Windows Vista*, Gartner (Dec. 21, 2005) (8 pages).

J. Kirk, *Gartner warns of metadata trouble with Vista OS*, Network World (Dec. 23, 2005) (3 pages).

Termination Decision in Case Nos. IPR2016-00541 and IPR2016-00542, dated Mar. 15, 2017 (4 pages).

Forrester et al., "An Investigation Into Unintentional Information Leakage Through Electronic Publication," Information and Computer Security Architecture, http://icsa.cs.up.ac.za/issa/2005/Proceedings/Poster/012_Article.pdf (2005).

Lonvick, RFC 3164, "The BSD Syslog Protocol" (Aug. 2001).

Aura et al., "Scanning Electronic Documents for Personally Identifiable Information," WPES '06 (2006).

Plaintiff Workshare Technology, Inc.'s Preliminary Invalidity Contentions, *Workshare Technology, Inc.* v. *Litera Technology LLC*, Civil Action No. 1-11-CV-00825-JAB-PTS (M.D. N.C. Mar. 26, 2012).

Exhibit 1 to Plaintiff Workshare Technology, Inc.'s Preliminary Invalidity Contentions, *Workshare Technology, Inc.* v. *Litera Technology LLC*, Civil Action No. 1:11-CV-00825-JAB-PTS (M.D. N.C. Mar. 26, 2012)—Claim Chart '276 Patent relative to Antonoff.

Exhibit 2 to Plaintiff Workshare Technology, Inc.'s Preliminary Invalidity Contentions, *Workshare Technology, Inc.* v. *Litera Technology LLC*, Civil Action No. 1:11-CV-00825-JAB-PTS (M.D. N.C. Mar. 26, 2012)—Claim Chart '276 Patent relative to Maes.

Exhibit 3 to Plaintiff Workshare Technology, Inc.'s Preliminary Invalidity Contentions, *Workshare Technology, Inc.* v. *Litera Technology LLC*, Civil Action No. 1:11-CV-00825-JAB-PTS (M.D. N.C. Mar. 26, 2012)—Claim Chart '276 Patent relative to Foygel.

Exhibit 4 to Plaintiff Workshare Technology, Inc.'s Preliminary Invalidity Contentions, *Workshare Technology, Inc.* v. *Litera Technology LLC*, Civil Action No. 1:11-CV-00825-JAB-PTS (M.D. N.C. Mar. 26, 2012)—Claim Chart '276 Patent relative to 3BClean.

Exhibit 5 to Plaintiff Workshare Technology, Inc.'s Preliminary Invalidity Contentions, *Workshare Technology, Inc.* v. *Litera Technology LLC*, Civil Action No. 1:11-CV-00825-JAB-PTS (M.D. N.C. Mar. 26, 2012)—Claim Chart '276 Patent relative to Bitform's Secure SDK System.

Exhibit 6 to Plaintiff Workshare Technology, Inc.'s Preliminary Invalidity Contentions, *Workshare Technology, Inc.* v. *Litera Technology LLC*, Civil Action No. 1:11-CV-00825-JAB-PTS (M.D. N.C. Mar. 26, 2012)—Claim Chart '276 Patent relative to the EZClean System.

Exhibit 7 to Plaintiff Workshare Technology, Inc.'s Preliminary Invalidity Contentions, *Workshare Technology, Inc.* v. *Litera Technology LLC*, Civil Action No. 1:11-CV-00825-JAB-PTS (M.D. N.C. Mar. 26, 2012)—Claim Chart '276 Patent relative to the EZClean System.

Exhibit 10 to Plaintiff Workshare Technology, Inc.'s Preliminary Invalidity Contentions, *Workshare Technology, Inc.* v. *Litera Technology LLC*, Civil Action No. 1:11-CV-00825-JAB-PTS (M.D. N.C. Mar. 26, 2012)—Claim Chart '276 Patent relative to the DEMO Fall 2005 Conference.

Exhibit 11 to Plaintiff Workshare Technology, Inc.'s Preliminary Invalidity Contentions, *Workshare Technology, Inc.* v. *Litera Tech-*

(56) References Cited

OTHER PUBLICATIONS

*nology LLC*, Civil Action No. 1:11-CV-00825-JAB-PTS (M.D. N.C. Mar. 26, 2012)—Claim Chart '276 Patent relative to the State of the Art.
Exhibit 12 to Plaintiff Workshare Technology, Inc.'s Preliminary Invalidity Contentions, *Workshare Technology, Inc. v. Litera Technology LLC*, Civil Action No. 1:11-CV-00825-JAB-PTS (M.D. N.C. Mar. 26, 2012)—Claim Chart '575 Patent relative to Antonoff.
Exhibit 13 to Plaintiff Workshare Technology, Inc.'s Preliminary Invalidity Contentions, *Workshare Technology, Inc. v. Litera Technology LLC*, Civil Action No. 1:11-CV-00825-JAB-PTS (M.D. N.C. Mar. 26, 2012)—Claim Chart '575 Patent relative to Maes.
Exhibit 14 to Plaintiff Workshare Technology, Inc.'s Preliminary Invalidity Contentions, *Workshare Technology, Inc. v. Litera Technology LLC*, Civil Action No. 1:11-CV-00825-JAB-PTS (M.D. N.C. Mar. 26, 2012)—Claim Chart '575 Patent relative to Foygel.
Exhibit 15 to Plaintiff Workshare Technology, Inc.'s Preliminary Invalidity Contentions, *Workshare Technology, Inc. v. Litera Technology LLC*, Civil Action No. 1:11-CV-00825-JAB-PTS (M.D. N.C. Mar. 26, 2012)—Claim Chart '575 Patent relative to the 3BClean System.
Exhibit 16 to Plaintiff Workshare Technology, Inc.'s Preliminary Invalidity Contentions, *Workshare Technology, Inc. v. Litera Technology LLC*, Civil Action No. 1:11-CV-00825-JAB-PTS (M.D. N.C. Mar. 26, 2012)—Claim Chart '575 Patent relative to Bitform's Secure SKD System.
Exhibit 17 to Plaintiff Workshare Technology, Inc.'s Preliminary Invalidity Contentions, *Workshare Technology, Inc. v. Litera Technology LLC*, Civil Action No. 1:11-CV-00825-JAB-PTS (M.D. N.C. Mar. 26, 2012)—Claim Chart '575 Patent relative to the EZClean System.
Exhibit 19 to Plaintiff Workshare Technology, Inc.'s Preliminary Invalidity Contentions, *Workshare Technology, Inc. v. Litera Technology LLC*, Civil Action No. 1:11-CV-00825-JAB-PTS (M.D. N.C. Mar. 26, 2012)—Claim Chart '575 Patent relative to the DEMOfall 2005 Conference.
Exhibit 20 to Plaintiff Workshare Technology, Inc.'s Preliminary Invalidity Contentions, *Workshare Technology, Inc. v. Litera Technology LLC*, Civil Action No. 1:11-CV-00825-JAB-PTS (M.D. N.C. Mar. 26, 2012)—Claim Chart '575 Patent relative to the State of the Art.
3BView: 3BOpenDoc, http://opendocument.kml.org/node/170 (2006).
3BClean: Clean Metadata from Documents, www.3bview.com/pages/3bclean.php (2005).
3BClean Secure Document Exchange, www.3bview.com/pages/index.php (2005).
3BView Secure Document Exchange, "Clean Metadata from Documents with 3BClean", www.3bview.com/3bclean.html (2005).
3BView Secure Document Exchange, "Features and Benefits of 3BClean", www.3bview.com/3bclean-features.html (2006).
38View Secure Document Exchange, "Automatic Cleaning of Email Attachments", www.3bview.com/3bclean-email.html (2006).
3BView Secure Document Exchange, "Technical Overview of 3BClean", www.3bview.com/3bclean-tech.html (2006).
3BView Secure Document Exchange Literature, "Controlling Document Metadata," (2005).
3BView Secure Document Exchange, "3B Transform", www.3bview.com/3btran.html (2006).
3BView Secure Document Exchange, "Clean Metadata from Documents with 3BClean", www.3bview.com/3bclean.html (2006).
3BView Secure Document Exchange, 3BOpenDoc—Covert Documents to and from ODF (Open Document Format), www.3bview.com/3opendoc_convert_ODF.html (2006).
3BView Secure Document Exchange, "3BOpen Doc: Making StarOffice and OpenOffice.org a Viable Option", www.3bview.com/3bopendoc.html (2006).
3BView Secure Document Exchange, "Solving Business Challenges Across Industries", available at www.3bview.com/3bclean-challenges.html (2006).
Summary, 3BClean Activity 2005—Jan. 2007 (2011).
J. Shaw, "Litera Patent U.S. Pat. No. 7,895,276 B2 (Argument for Prior Art)" Version 1.3, (2011).
3BView.com Website 2005-2006, www.3bview.com (2006).
Bitform Secure SDK 2005.1, www.bitform.net/products/securesdk/ (2005).
Bitform Extract SDK 2005.1, www.bitform.net/products/extractsdk/ (2005).
Bitform Secure SDK 2005.2, www.bitform.net/products/securesdk/ (2006).
Bitform Secure SDK 2005.1, www.bitform.net/products/extractsdk/ (2006).
Kraft, Kenney & Lesser, "Think Your Deletions Are Gone Forever? Think Again!". http://www.kklsoftware.com (2004).
Clearswift™, "CS MAILsweeper™ 4.3 for SMTP: Frequently Asked Questions" (2002).
Clearswift™, "CS MAILsweeper™ 4.3 for SMTP: Evaluation Guide" (2002).
Clearswift™, "CS MAILsweeper for SMTP Version 4.3 New Features Guide" (2002).
Clearswift MIMEsweeper™, "CS MAILsweeper 4.3 for SMTP: Effective e-Policy implementation to analyze, protect and manage incoming and outgoing email at the Internet gateway" (2002).
Workshare Press Release, "Workshare Delivers Groundbreaking Document Hygiene Technology to Individual Users and Small Business" (Nov. 10, 2005).
Workshare Press Release, "Workshare Project Enterprise Debuts Policy Management for Microsoft Windows Rights Management Services at RSA Conference" (Feb. 15, 2006).
Workshare Press Release, "Workshare Unveils the Workshare Protect Enterprise Suite to Cure Information Leakage Without Crippling Business" (Feb. 6, 2006).
Workshare Press Release, "Workshare Selected to Present at DEMOfall 2005" (Aug. 23, 2005).
Workshare Press Release, "Workshare Previews Groundbreaking Document Security Technology at DEMOfall 2005" (Sep. 20, 2005).
RSA 2006: Product Announcements, http://searchsecurity.techtarget.com/feature/RSA-2006-Product-announcements (2006).
RSA Conference 2006, http://searchsecurity.techtarget.com/feature/RSA-Conference-2006 (2006).
Workshare Press Release, "Workshare Protect Mobile Delivers Industry's First Complete Mobile Workforce Data Loss Prevention Solution" (2006).
Workshare Technology, Inc.'s Expert Report of Michael J. Freedman, Ph.D, Regarding Invalidity of U.S. Pat. No. 7,895,276 and U.S. Pat. No. 8,060,575, *Workshare Technology, Inc. v. Litera Technologies LLC*, Civil Action No. 1-11-CV-00825-JAB-JEP (M.D. N.C. (Apr. 4, 2013).
Appendix 1 to Freedman Expert Report—Claim Chart '276 Patent relative to Antonoff.
Appendix 2 to Freedman Expert Report—Claim Chart '276 Patent relative to Maes.
Appendix 3 to Freedman Expert Report—Claim Chart '276 Patent relative to Foygel.
Appendix 4 to Freedman Expert Report—Claim Chart '276 Patent relative to the 3BClean System.
Appendix 5 to Freedman Expert Report—Claim Chart '276 Patent relative to Bitform's Secure SDK System.
Appendix 6 to Freedman Expert Report—Claim Chart '276 Patent relative to the EZClean System.
Appendix 7 to Freedman Expert Report—Claim Chart '276 Patent relative to Bitform's Secure SDK System (Source Code).
Appendix 10 to Freedman Expert Report—Claim Chart '276 Patent relative to Workshare DEMOfall 2005 demonstration.
Appendix 11 to Freedman Expert Report—Claim Chart '276 Patent relative to the State of the Art.
Appendix 12 to Freedman Expert Report—Claim Chart '276 Patent relative to Antonoff.
Appendix 13 to Freedman Expert Report—Claim Chart '575 Patent relative to Maes.
Appendix 14 to Freedman Expert Report—Claim Chart '575 Patent relative to Foygel.

(56) References Cited

OTHER PUBLICATIONS

Appendix 15 to Freedman Expert Report—Claim Chart '575 Patent relative to the 3BClean System.
Appendix 16 to Freedman Expert Report—Claim Chart '575 Patent relative to Bitform's Secure SDK System (20 pages).
Appendix 17 to Freedman Expert Report—Claim Chart '575 Patent relative to the EZClean System.
Appendix 19 to Freedman Expert Report—Claim Chart '575 Patent relative to the Workshare System Demonstration at the DEMOfall 2005 Conference.
Appendix 20 to Freedman Expert Report—Claim Chart '575 Patent relative to the State of the Art.
Stipulation of Dismissal with Prejudice in *Workshare Technology, Inc. v. Litera Technologies LLC*, Civil Action No. 1-11-CV-00825-JAB-JEP (M.D. N.C. Sep. 2, 2014).
Workshare Technology, Inc.'s Objections and Responses to Defendant Litera Technologies, LLC's Interrogatories, Set Three (Nos. 3-9) (Sep. 27, 2012).
Workshare Technology Inc.'s Brief in Support of its Motion for Summary Judgment that the Asserted Claims of the Patents-in-Suit are Invalid Under 35 U.S.C. §§ 102 and 103, *Workshare Technology, Inc. v. Litera Technologies LLC*, Civil Action No. 1-11-CV-00825-JAB-JEP (M.D. N.C. (Jul. 12, 2013).
Declaration of Christopher Kao in Support of Workshare Technology, Inc.'s Motion for Summary Judgment that the Asserted Claims of the Patents-In-Suit are Invalid Under 35 U.S.C. §§ 102 and 103, *Workshare Technology, Inc. v. Litera Technologies LLC*, Civil Action No. 1-11-CV-00825-JAB-JEP (M.D. N.C.) (Jul. 12, 2013).
Exhibit 3 to Kao Declaration in Support of Workshare Technology, Inc.'s Motion for Summary Judgment, Examination Before Trial of Marcus Bluestein, *Workshare Technology, Inc. v. Litera Technologies LLC*, Civil Action No. 1-11-CV-00825-JAB-JEP (M.D. N.C.) (Apr. 5, 2013).
Exhibit 4 to Kao Declaration in Support of Workshare Technology, Inc.'s Motion for Summary Judgment, KKL Software: Think Your Deletions Are Gone Forever? http://web.archive.org/web/20040727132558/http:/www.kklsoftware.com (2004).
Exhibit 5 to Kao Declaration in Support of Workshare Technology, Inc.'s Motion for Summary Judgment, Affidavit of Christopher Butler, (Jun. 21, 2013).
Exhibit 6 to Kao Declaration in Support of Workshare Technology, Inc.'s Motion for Summary Judgment, KKL Software: ezClean makes it easy!, http://web.archive.org/web/20040727132558/http:/www.kklsoftware.com (2004). This document was retrieved from the public PACER docket, as indicated by the document header.
Exhibit 7 to Kao Declaration in Support of Workshare Technology, Inc.'s Motion for Summary Judgment, ezClean Integration Guide v3.3. This document was retrieved from the public PACER docket, as indicated by the document header.
Exhibit 8 to Kao Declaration in Support of Workshare Technology, Inc.'s Motion for Summary Judgment, Excerpt of Deposition of Dr. Martin William Brown (May 21, 2013). This document was retrieved from the public PACER docket, as indicated by the document header.
Exhibit 9 to Kao Declaration in Support of Workshare Technology, Inc.'s Motion for Summary Judgment, 3BClean: Secure Document Exchange, http://web.archive.org/web/20051201012525.http://www.3bview.com/pages/index.php (2005).
Exhibit 10 to Kao Declaration in Support of Workshare Technology, Inc.'s Motion for Summary Judgment, Silver et al. "Plan to Deal with Metadata Issues with Windows Vista" (Dec. 21, 2006). This document was retrieved from the public PACER docket, as indicated by the document header.
Exhibit 11 to Kao Declaration in Support of Workshare Technology, Inc.'s Motion for Summary Judgment, 3BClean: What is the problem?, http://web.archive.org/web/20051216102451.http://www.3bview.com/pages/3bclean.php (2005).
Exhibit 12 to Kao Declaration in Support of Workshare Technology, Inc.'s Motion for Summary Judgment, E-mail correspondence (Jun. 20, 2003). This document was retrieved from the public PACER docket, as indicated by the document header.
Exhibit 13 to Kao Declaration in Support of Workshare Technology, Inc.'s Motion for Summary Judgment, E-mail correspondence (Dec. 16, 2003). This document was retrieved from the public PACER docket, as indicated by the document header.
Exhibit 14 to Kao Declaration in Support of Workshare Technology, Inc.'s Motion for Summary Judgment, E-mail correspondence (Jan. 9, 2004).
Exhibit 15 to Kao Declaration in Support of Workshare Technology, Inc.'s Motion for Summary Judgment, E-mail correspondence (Sep. 28, 2004). This document was retrieved from the public PACER docket, as indicated by the document header.
Exhibit 16 to Kao Declaration in Support of Workshare Technology, Inc.'s Motion for Summary Judgment, Excerpt of Deposition of Workshare Technology, Inc. 30(b)(6) Matthew Brown (Apr. 16, 2013), This document was retrieved from the public PACER docket, as indicated by the document header.
Exhibit 17 to Kao Declaration in Support of Workshare Technology, Inc.'s Motion for Summary Judgment, Excerpt of Deposition of Workshare Technology, Inc. 30(b)(6) Matthew Brown (Apr. 17, 2013).
Exhibit 18 to Kao Declaration in Support of Workshare Technology, Inc.'s Motion for Summary Judgment, Workshare Press Release, "Workshare Previews Groundbreaking Document Security Technology at DEMOfall 2005" (Sep. 20, 2005).
Exhibit 19 to Kao Declaration in Support of Workshare Technology, Inc.'s Motion for Summary Judgment, Excerpt of Litera Technologies, Inc.'s Expert Rebuttal Report of John Guyer (May 22, 2013), This document was retrieved from the public PACER docket, as indicated by the document header.
Exhibit 20 to Kao Declaration in Support of Workshare Technology, Inc.'s Motion for Summary Judgment, Litera Technologies, LLC's Supplemental Response to Workshare Technology Inc.'s Interrogatory No. 4, *Workshare Technology, Inc. v. Litera Technologies LLC*, Civil Action No. 1-11-CV-00825-JAB-JEP (M.D. N.C.) (May 29, 2012).
Exhibit 21 to Kao Declaration in Support of Workshare Technology, Inc.'s Motion for Summary Judgment, Excerpt of Deposition of Deepak Massand (Apr. 22, 2013), This document was retrieved from the public PACER docket, as indicated by the document header.
Exhibit 22 to Kao Declaration in Support of Workshare Technology, Inc.'s Motion for Summary Judgment, S. Ferrara, "Blackberry Communication Flow" (2004). This document was retrieved from the public PACER docket, as indicated by the document header.
Exhibit 24 to Kao Declaration in Support of Workshare Technology, Inc.'s Motion for Summary Judgment, Excerpt of Deposition of John Guyer (Jun. 25, 2013). This document was retrieved from the public PACER docket, as indicated by the document header.
Exhibit 25 to Kao Declaration in Support of Workshare Technology, Inc.'s Motion for Summary Judgment, Workshare DEMOfall 2005 demonstration screenshots. This document was retrieved from the public PACER docket, as indicated by the document header.
Exhibit 26 to Kao Declaration in Support of Workshare Technology, Inc.'s Motion for Summary Judgment, Workshare Technology, Inc.'s Expert Report of Michael J. Freedman, Ph.D, Regarding Invalidity of U.S. Pat No. 7,895,276 and U.S. Pat. No. 8,060,575, *Workshare Technology, Inc. v. Litera Technologies LLC*, Civil Action No. 1-11-CV-00825-JAB-JEP (M.D. N.C. (Apr. 4, 2013), including Exhibit A, Exhibit B, and Appendices 4, 6, 8, 15, 17, and 18. This document was retrieved from the public PACER docket, as indicated by the document header.
Exhibit 27 to Kao Declaration in Support of Workshare Technology, Inc.'s Motion for Summary Judgment, Excerpt of Deposition of Mr. Barrie Hadfield (May 22, 2013). This document was retrieved from the public PACER docket, as indicated by the document header.
Litera Technologies, Inc.'s Brief in Opposition to Workshare Technology Inc.'s Motion for Summary Judgment, *Workshare Technology, Inc. v. Litera Technologies LLC*, Civil Action No. 1-11-CV-00825-JAB-JEP (M.D. N.C. Aug. 12, 2013).
Declaration of John Guyer in Support of Litera Technologies, Inc.'s Brief in Opposition to Workshare Technology Inc.'s Motion for

(56) References Cited

OTHER PUBLICATIONS

Summary Judgment, *Workshare Technology, Inc. v. Litera Technologies LLC*, Civil Action No. 1-11-CV-00825-JAB-JEP (M.D. N.C. (Aug. 12, 2013).
Workshare Technology, Inc.'s Reply in Support of its Motion for Summary Judgment that the Asserted Claims of the Patents-in-Suit are Invalid Under 35 U.S.C. §§ 102 and 103, *Workshare Technology, Inc. v. Litera Technologies LLC*, Civil Action No. 1-11-CV-00825-JAB-JEP (M.D. N.C. (Aug. 26, 2013).
Litera Technologies, Inc.'s Motion for Leave to File Limited Surreply and for Oral Argument and Incorporated Memorandum of Law, *Workshare Technology, Inc. v. Litera Technologies LLC*, Civil Action No. 1-11-CV-00825-JAB-JEP (M.D. N.C. (Sep. 5, 2013). This document was retrieved from the public PACER docket, as indicated by the document header.
Workshare Technology, Inc.'s Response in Opposition to Litera Technologies, LLC's Motion for Leave to File Limited Surreply, *Workshare Technology, Inc. v. Litera Technologies LLC*, Civil Action No. 1-11-CV-00825-JAB-JEP (M.D. N.C. (Sep. 27, 2013).
Memorandum Opinion and Order regarding claim construction, *Workshare Technology, Inc. v. Litera Technologies LLC*, Civil Action No. 1-11-CV-00825-JAB-PTS (M.D. N.C. Mar. 28, 2013).
Litera Technologies, LLC's, Opening Claim Construction Brief, *Workshare Technology, Inc. v. Litera Technologies LLC*, Civil Action No. 1-11-CV-00825-JAB-JEP (M.D. N.C. Nov. 13, 2012).
Declaration of Michael J. Thomas in Support of Litera Technologies, LLC's Opening Claim Construction Brief, *Workshare Technology, Inc. v. Litera Technologies LLC*, Civil Action No. 1-11-CV-00825-JAB-JEP (M.D. N.C. (Nov. 13, 2012).
Exhibit C to Thomas Declaration in Support of Litera Technologies, LLC's Opening Claim Construction Brief, Workspace Press Release, "Workshare Provides Server-based Metadata Removal for Leading Canadian Law Firm McMillan" (Dec. 1, 2010).
Exhibit E to Thomas Declaration in Support of Litera Technologies, LLC's Opening Claim Construction Brief, Letter from M. Thomas to P. Corrigan (Apr. 16, 2012).
Exhibit F to Thomas Declaration in Support of Litera Technologies, LLC's Opening Claim Construction Brief, Plaintiff Workshare Technology, Inc.'s Proposed Terms for Claim Construction (Apr. 16, 2012).
Exhibit G to Thomas Declaration in Support of Litera Technologies, LLC's Opening Claim Construction Brief, Defendant Litera Technologies, LLC's Preliminary Claim Constructions (Aug. 7, 2012).
Exhibit J to Thomas Declaration in Support of Litera Technologies, LLC's Opening Claim Construction Brief, Amendment in U.S. Appl. No. 11/699,750 (dated Feb. 16, 2009).
Exhibit H to Thomas Declaration in Support of Litera Technologies, LLC's Opening Claim Construction Brief, Plaintiff Workshare Technology, Inc.'s Preliminary Claim Constructions and Extrinsic Evidence (Aug. 7, 2012).
Workshare Technology, Inc.'s Responsive Claim Construction Brief, *Workshare Technology, Inc. v. Litera Technologies LLC*, Civil Action No. 1-11-CV-00825-JAB-PTS (M.D. N.C. Dec. 4, 2012).
Declaration of Christopher Kao in Support of Workshare Technology, Inc.'s Responsive Claim Construction Brief (Dec. 4, 2012).
Exhibit A to Kao Declaration in Support of Workshare Technology, Inc.'s Responsive Claim Construction Brief, KKL Software: ezClean makes it easy!, http://web.archive.org/web/20040727132558/http:/www.kklsoftware.com (2004). This document was retrieved from the public PACER docket, as indicated by the document header.
Exhibit B to Kao Declaration in Support of Workshare Technology, Inc.'s Responsive Claim Construction Brief, Kraft, Kenney & Lesser, "Think Your Deletions Are Gone Forever? Think Again!". http://www.kklsoftware.com (2004).
Exhibit C to Kao Declaration in Support of Workshare Technology, Inc.'s Responsive Claim Construction Brief, 3BView Secure Document Exchange Literature, "Controlling Document Metadata" (2005).
Exhibit D to Kao Declaration in Support of Workshare Technology, Inc.'s Responsive Claim Construction Brief, 3BClean Secure Document Exchange, www.3bview.com/pages/index.php (2005).

Exhibit E to Kao Declaration in Support of Workshare Technology, Inc.'s Responsive Claim Construction Brief, Workshare Press Release, "Workshare Updates Market Leading Solutions with Document 'Hygiene' Technology, Unicode Compliance and More" (Oct. 20, 2005).
Exhibit G to Kao Declaration in Support of Workshare Technology, Inc.'s Responsive Claim Construction Brief, Workshare Press Release, "Workshare Previews Groundbreaking Document Security Technology at DEMOfall 2005" (Sep. 20, 2005).
Exhibit F to Kao Declaration in Support of Workshare Technology, Inc.'s Responsive Claim Construction Brief, Litera Press Release, "Litera Announces Release of Medacte Providing Enterprise wide, Server-based Metadata Removal" (Aug. 18, 2011).
Exhibit I to Kao Declaration in Support of Workshare Technology, Inc.'s Responsive Claim Construction Brief, Amendment in U.S. Appl. No. 11/699,750 (dated Feb. 16, 2009).
Exhibit K to Kao Declaration in Support of Workshare Technology, Inc.'s Responsive Claim Construction Brief, The Authoritative Dictionary of IEEE Standards Terms 17 (7th ed. 2000).
Litera Technologies, LLC's, Reply to Workshare's Responsive Claim Construction Brief, *Workshare Technology, Inc. v. Litera Technologies LLC*, Civil Action No. 1-11-CV-00825-JAB-PTS (M.D. N.C. Dec. 14, 2012).
Supplemental Declaration of Michael J. Thomas in Support of Litera Technologies, LLC's, Reply to Workshare's Responsive Claim Construction Brief, *Workshare Technology, Inc. v. Litera Technologies LLC*, Civil Action No. 1-11-CV-00825-JAB-PTS (M.D. N.C. Dec. 14, 2012).
Exhibit A to Supplemental Declaration of Michael J. Thomas in Support of Litera Technologies, LLC's, Reply to Workshare's Responsive Claim Construction Brief, ezClean Installation Guide and Admin Manual v.3.0.x This document was retrieved from the public PACER docket, as indicated by the document header.
Exhibit B to Supplemental Declaration of Michael J. Thomas in Support of Litera Technologies, LLC's, Reply to Workshare's Responsive Claim Construction Brief, Email correspondence (Feb. 27, 2009).
Email correspondence between C. Brode and P. Klukowski (Sep. 19, 2006).
Email correspondence between M. Brown and P. Klukowski (Sep. 21, 2006).
"Service Support Offerings Professional & Learning Services"; Clearswift Services (12 pages).
"Think Your Deletions Are Gone Forever? Think Again! ezClean™ Makes Metadata Removal Easy!"; Kraft & Kennedy Lesser; dated Jul. 27, 2004, (1 page).
"Think Your Deletions Are Gone Forever? Think Again! ezClean™ Makes Metadata Removal Easy!"; Kraft & Kennedy Lesser; dated Apr. 5, 2005. (1 page).
"Think Your Deletions Are Gone Forever? Think Again! ezClean™ Makes Metadata Removal Easy!"; Kraft & Kennedy Lesser; dated Mar. 17, 2005. (1 page).
"User's Guide by KKL Software"; ezClean Version 3.1 (15 pages).
"Installation Guide and Admin Manual by KKL Software"; ezClean Version 3.0.x (14 pages).
"Installation Guide and Admin Manual by KKL Software"; ezClean; Version 3.3 (34 pages).
"Integration Guide for use with CS MailSweeper for SMTP"; ezClean; Version 3.3; KKL Software (15 pages).
"BETA Program Agreement" (4 pages).
"How do I make sure that there is no embarrassing Metadata in any documents that I attach to e-mails?"; KKL Software (2 pages).
"How do I remove metadata from documents that I attach to e-mails?"; KKL Software (1 page).
Beta Program Guide; "MAILsweeper for SMTP 4.3" (5 pages).
Beta Program Qualification Form; "MAILsweeper for SMTP 4.3" (4 pages).
Petition for Inter Partes Review of U.S. Pat. No. 7,895,276 in *DocsCorp LLC v. Litera Technologies LLC*, Case IPR2016-00541 (PTAB Feb. 10, 2016) (Paper 1) (70 pages).

(56) References Cited

OTHER PUBLICATIONS

Declaration of Dr. Michael J. Freedman in Support of Petition for Inter Partes Review of U.S. Pat. No. 7,895,276 in *DocsCorp LLC v. Litera Technologies LLC*, Case IPR2016-00541 (PTAB Feb. 10, 2016) (Paper 6) (138 pages).
Petition for Inter Partes Review of U.S. Pat. No. 8,060,575 in *DocsCorp LLC v. Litera Technologies LLC*, Case IPR2016-00542 (PTAB Feb. 10, 2016) (Paper 1) (72 pages).
Declaration of Dr. Michael J. Freedman in Support of Petition for Inter Partes Review of U.S. Pat. No. 8,060,575 in *DocsCorp LLC v. Litera Technologies LLC*, Case IPR2016-00542 (PTAB Feb. 10, 2016) (Paper 6) (143 pages).
Ex. 1003 to Petition in Case IPR2016-00541 and IPR2016-00542, KKL Software webpage on the 2004 ezClean software website by Kraft Kennedy Lessar, Inc. (Paper 7) (2 pages).
Ex. 1004 to Petition in Case IPR2016-00541 and IPR2016-00542, ezClean details webpage on the 2004 ezClean software website by Kraft Kennedy Lessar, Inc. (Paper 8) (4 pages).
Ex. 1005 to Petition in Case IPR2016-00541 and IPR2016-00542, ezClean New Features webpage on the 2004 ezClean software website by Kraft Kennedy Lessar, Inc. (Paper 9) (3 pages).
Ex. 1006 to Petition in Case IPR2016-00541 and IPR2016-00542, ezClean 3.2 New Features webpage on the 2004 ezClean software website by Kraft Kennedy Lessar, Inc. (Paper 10) (3 pages).
Ex. 1007 to Petition in Case IPR2016-00541 and IPR2016-00542, ezClean FAQ webpage on the 2004 ezClean software website by Kraft Kennedy Lessar, Inc, (Paper 11) (3 pages).
Ex. 1008 to Petition in Case IPR2016-00541 and IPR2016-00542, ezClean Version 3.3 Installation Guide and Admin Manual by KKL Software on the 2005 ezClean software website by Kraft Kennedy Lessar, Inc. (Paper 12) (36 pages).
Ex. 1009 to Petition in Case IPR2016-00541 and IPR2016-00542, Declaration of Christopher Butler, Office Manager at the Internet Archive, dated Nov. 17, 2015 (Paper 13) (2 pages).
Ex. 1010 to Petition in Case IPR2016-00541 and IPR2016-00542, Exhibit A to the Declaration of Christopher Butler (Paper 14) (55 pages).
Ex. 1011 to Petition in Case IPR2016-00541 and IPR2016-00542, U.S. Pat. No. 7,640,308 to Antonoff (Paper 15) (12 pages).
Ex. 1012 to Petition in Case IPR2016-00541 and IPR2016-00542, U.S. Pat. No. 7,570,964 to Maes (Paper 16) (12 pages).
Ex. 1013 to Petition in Case IPR2016-00541 and IPR2016-00542, U.S. Pat. No. 8,209,538 to Craigie (Paper 17) (10 pages).
Ex. 1014 to Petition in Case IPR2016-00541 and 1PR2016-00542, CS MAILsweeper 4.3 for SMTP by Clearswift Ltd (2002) (Paper 18) (5 pages).
Ex. 1015 to Petition in Case IPR2016-00541 and IPR2016-00542, MIMEsweeper Solutions webpage on the 2002 website (Paper 19) (2 pages).
Ex. 1016 to Petition in Case IPR2016-00541 and IPR2016-00542, Lotus Announces cc Mail for The World Wide Web, Provides Easy Access to EMail Via the Web, PR Newswire (Sep. 26, 1995) (Paper 20) (4 pages).
Ex. 1017 to Petition in Case IPR2016-00541 and IPR2016-00542, Simple Mail Transfer Protocol, Internet Engineering Task Force (IETF), RFC 821 (Aug. 1982) (Paper 21) (73 pages).
Ex. 1018 to Petition in Case IPR2016-00541 and IPR2016-00542, MIME (Multipurpose Internet Mail Extensions) Mechanisms for Specifying and Describing the Format of Internet Message Bodies, Internet Engineering Task Force (IETF), RFC 1341 (Jun. 1992) (Paper 22) (71 pages).
Ex. 1019 to Petition in Case IPR2016-00541 and IPR2016-00542, Middleboxes Taxonomy and Issues, Internet Engineering Task Force (IETF), RFC 3234 (Feb. 2002) (Paper 23) (28 pages).
Co-pending U.S. Appl. No. 11/444,140, filed May 30, 2006, to Deepak MASSAND, entitled "Method of Compound Document Comparison".
Co-pending U.S. Appl. No. 12/406,093, filed Mar. 17, 2009, to Deepak MASSAND, entitled "System and Method for the Comparison of Content Within Tables Separate From Form and Structure".
Co-pending U.S. Appl. No. 12/350,144, filed Jan. 7, 2009, to Deepak MASSAND, entitled "System and Method for Comparing digital Data in spreadsheets or Database Tables".

\* cited by examiner

SYSTEMS AND METHODS FOR DETECTING, REPORTING AND CLEANING METADATA FROM INBOUND ATTACHMENTS

FIELD

The present disclosure generally relates to systems and methods for managing and cleaning attachments. In particular, the disclosed embodiments generally relate to systems and methods for managing and cleaning inbound electronic message attachments.

BACKGROUND

Electronic messages, such as email, have become a prevalent means of sending and receiving information. Such information may be contained in an email message itself, as well as in an electronic document or file included as an attachment to such an electronic message. Senders of email messages often include electronic documents and files attached to email messages, and electronic documents and files attached to email messages often include metadata such as Macros and/or VBA code which can be used to hide, install, and run harmful scripts on a computer when the recipient opens the attachments. Such metadata in email attachments may pose certain security risks and concerns to recipients of email.

One conventional means of screening inbound emails with attached electronic documents has included the use of spam or junk email filters. The use of spam filters, however, often results in recipients failing to review emails and electronic documents due to their spam categorization and relegation to a spam or junk folder. In addition, while various antivirus software products such as Norton Antivirus™, McAfee™ Anti Virus Plus, Barracuda Web Filter, and Stanford Anti-Malware provide a certain level of protection to email recipients, such products do not provide for the removal of metadata including VBA code which is not considered malware by itself but can be used to camouflage and hide malware in electronic documents attached to inbound emails. There is also the need to inspect the attachments to detect the metadata and to provide the recipient with a report on the metadata found in the inbound attachments.

Thus, current products do not provide enough versatility and convenience for efficiently detecting, reporting, removing and cleaning metadata from inbound email attachments. For example, conventional systems do not analyze incoming emails for attachments containing metadata and clean such metadata from attachments before the incoming emails arrive at an email exchange server or arrive at a user's email inbox. Conventional systems also do not generate reports to recipients on detected or removed metadata from inbound email attachments. Nor do such systems allow for an interface that permits users to set email attachment metadata cleaning options for inbound emails, including designating predetermined types of metadata for removal or reporting and designating processes for the review of inbound email attachments.

Accordingly, there is a need for systems and methods that provide greater versatility and convenience for detecting, reporting, removing and cleaning metadata from inbound email attachments.

SUMMARY

The disclosed embodiments provide, among other things, systems and methods for detecting, reporting, removing and cleaning inbound email attachments.

In one embodiment, a system is disclosed for cleaning metadata from inbound attachments. The system may be associated with a client device operated by an electronic message recipient. The system may include a memory storing instructions and one or more processors configured to execute the instructions to perform one or more operations. The one or more operations may include intercepting an inbound electronic message sent to the recipient. The one or more operations may also include determining that an electronic document attached to the inbound electronic message includes metadata. The one or more operations may also include creating a modified electronic document by removing at least a portion of the metadata from the attached electronic document. The one or more operations may further include generating a report describing metadata included in the attached electronic document. In addition, the one or more operations may include generating information for sending the report and the inbound electronic message with the modified electronic document to the client device.

In another embodiment, a method is disclosed for cleaning metadata from inbound attachments. The method may include intercepting, at an intermediate computer that is associated with a client device operated by an electronic message recipient, an inbound electronic message sent to the recipient. The method may include may also include determining that an electronic document attached to the inbound electronic message includes metadata. The method may also include may also include creating a modified electronic document by removing at least a portion of the metadata from the attached electronic document. The method may further include generating a report describing metadata included in the attached electronic document. In addition, the method may include generating information for sending the report and the inbound electronic message with the modified electronic document to the client device.

In another embodiment, a non-transitory computer-readable storage medium is disclosed. The storage medium may store instructions for cleaning metadata from inbound attachments. The instructions may cause one or more computer processors to perform one or more operations. The one or more operations may include intercepting, at an intermediate computer that is associated with a client device operated by an electronic message recipient, an inbound electronic message sent to the recipient. The one or more operations may also include determining that an electronic document attached to the inbound electronic message includes metadata. The one or more operations may also include creating a modified electronic document by removing at least a portion of the metadata from the attached electronic document. The one or more operations may further include generating a report describing metadata included in the attached electronic document. In addition, the one or more operations may include generating information for sending the report and the inbound electronic message with the modified electronic document to the client device.

It is to be understood that both the foregoing general description and the following detailed description are exemplary and explanatory only. Exemplary objects and advantages of the disclosed embodiments are set forth below, and in part will be apparent from the description, or may be learned by practice of the disclosed embodiments. Certain objects and advantages of the disclosed embodiments may be realized and attained by means of the elements and combinations particularly pointed out in the appended claims.

BRIEF DESCRIPTION OF DRAWING(S)

The accompanying drawings, which are incorporated in and constitute a part of this specification, illustrate various embodiments and aspects of the disclosed embodiments. In the drawings.

DETAILED DESCRIPTION

Reference will now be made in detail to exemplary disclosed embodiments, examples of which are illustrated in the accompanying drawings. Wherever possible, the same reference numbers will be used throughout the drawings to refer to the same or like parts.

Figure 1A:
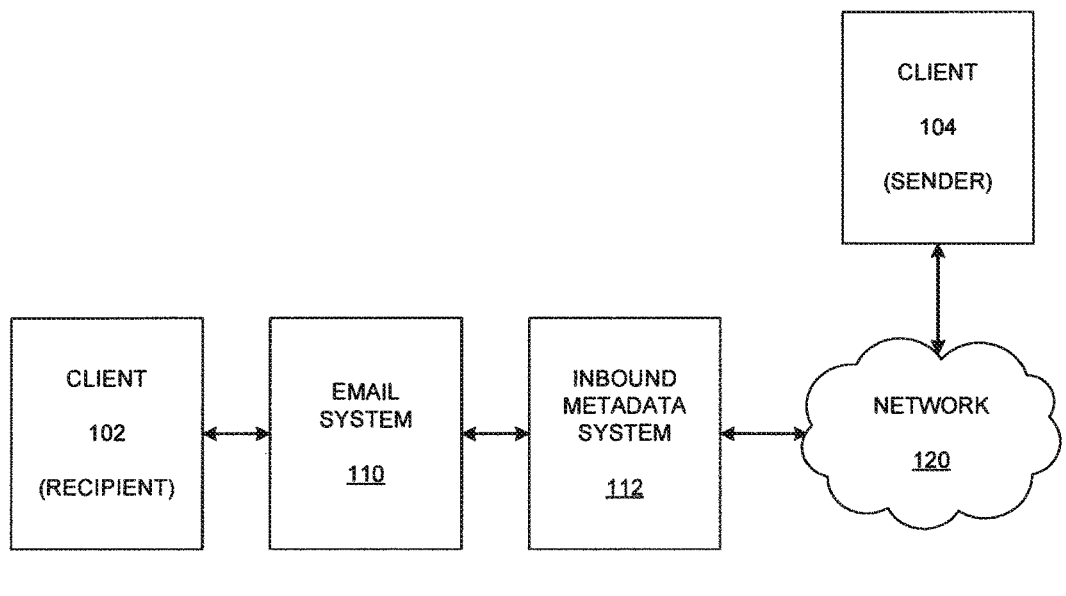
FIG. 1A illustrates an exemplary system environment consistent with disclosed embodiments.

FIG. 1A illustrates an exemplary system environment 100 consistent with certain disclosed embodiments. System 100 may include one or more clients 102, 104 that may be connected to a network 120 and can communicate with each either via electronic messages (e.g., email) sent over network 120 (e.g., the Internet). For example, client 104 may be configured to send emails containing one or more attachments over network 120, and client 102 may be configured to receive emails containing one or more attachments over network 120. In certain embodiments, system 100 may enable client 102 to receive emails sent by client 104 containing one or more attachments via an email system 110 and/or an inbound metadata system 112. In still other embodiments, client 104 may be configured to receive emails containing one or more attachments over network 120, and client 102 may be configured to send such emails to client 104 via an email system and an inbound metadata system.

Client 102, 104 may be a computer system including one more computing components for performing one or more processes consistent with certain aspects of the disclosed embodiments. In one embodiment, client 102, 104 may include one or more computer or data processing devices such as a PC, laptop computer, desktop computer, tablet, mobile phone, smart phone, or other mobile devices that have hardware (e.g., one or more processors, storage memory, data buses, network interface, etc.), software (e.g., web browsers, application programs, operating systems, add-ins for software programs or systems, other executable program code written in any known programming language such as PL/SQL, AJAX, XML, JavaScript™, C, C++, Java™, etc.), and/or firmware (e.g., software embedded in a hardware device). Client 102, 104 may be configured to communicate with one or more networks, such as network 120, and with other clients or servers connected to network 120, including other computers or components connected to a local network. Client 102, 104 may execute software processes stored on tangible and non-transitory computer-readable mediums that perform one or more processes consistent with the disclosed embodiments.

One or more users may operate one or more components of client 102, 104 to perform one or more processes consistent with the disclosed embodiments. Client 102, 104 may be associated with an entity, such as a company, organization, government agency, educational or medical facility, firm, or any other type of business or non-business entity. In certain embodiments, client 102 may be associated with an entity that is different from that associated with client 104. Alternatively, client 102 and client 104 may be associated with the same entity. Further, client 102 may be associated with a department, division, etc., of an entity that is different from a department, division, etc., of the same entity associated with client 104.

While FIG. 1A illustrates two clients 102, 104, aspects of the disclosed embodiments are not limited to such a configuration. Thus, the disclosed embodiments may be implemented with any number of clients interconnected by one or more networks, including but not limited to network 120. Further, the term "client" used herein to describe client 102, 104 is not intended to be limiting to a client in the sense of known client-server configurations, although such configurations may be implemented by the disclosed embodiments. For example, client 102, 104, may be (or include) a server-type computer system or server software that may also request and receive information, data, services, processes, etc., from another computer system in a local and/or remote network.

In one embodiment, client 102, 104 may employ hardware, software, or firmware to create, save, send, receive, delete, and the like, one or more electronic messages, such as email messages. In one embodiment, client 104 and its respective user(s) or entity(ies) associated with client 104 may be a sender of an email. For example, a client 104 may be operated by a sender to create, maintain, save, store, or otherwise prepare an email. A client 104 may additionally be operated by a sender to attach one or more attachments to an email. Client 102 may be operated or configured by a recipient to receive an email from a sender operating client 104. In certain aspects, a recipient operating client 102 may receive an email that may contain or more attachments from a sender operating client 104. In other embodiments, client 102 may similarly be operated to perform the same or similar operations as client 104, and vice versa. Other clients (not shown) may also be implemented such that each may be senders, recipients, or both, respective to other clients.

Network 120 may be any type of communication network configured to communicate information in system 100. Network 120 may be a wireless and/or wireline network including one or more components (e.g., hardware, software, and/or firmware) configured to receive, route, translate, and deliver information. For example, network 120 may be the Internet, an Extranet, an Intranet, a Local Area Network, Wide Area Network, etc., and combinations of such exemplary networks, that enables clients (or other computer systems) to communicate in accordance with aspects of the disclosed embodiments. Network 120 may include infrastructure that implements the communication of information over these types of networks, such as routers, bridges, servers, wireless/wireline base stations, transceivers, and related technology. In certain embodiments, network 120 may be separate networks that connect client 102 and client 104 either directly or indirectly. In other embodiments, network 120 may connect client 102, 104 to an email system 110 or an inbound metadata system 112, or to other intermediate servers, computer systems, or other devices. In still other embodiments, network 120 may connect client 102 and client 104 through separate networks or connections within the same network via an email system 110 or an inbound metadata system 112, or to other intermediate servers, computer systems, or other devices. For example, network 120 may include a local area network, wide area network, portions of the Internet etc., that provide connections between client 102 and client 104 that is different (in whole or in part) than a local area network, wide area network, portions of the Internet etc., that provides connections between client 102, 104 and different intermediate servers, computer systems, or other devices.

Email system 110 may be a system that provides email functions, applications, and other types of services consistent with the disclosed embodiments, e.g., such as an email exchange server. In certain embodiments, email system 110 may be a web-based email system that interconnects with one or more clients, such as clients 102, 104, over the Internet. Consistent with the disclosed embodiments, email system 110 may include one or more servers and memory storage devices that host or provide email applications and/or services. Email system 110 may include one or more computer or data processing devices that have hardware, software, and/or firmware. Email system 110 may also include one or more memory devices, such as local or networked memory storage media, shared memory platforms, or a combination thereof. In certain embodiments, email system 110 includes memory that stores emails, folders of emails, documents, email attachments, information, data, etc., for sending, receiving, and viewing by clients 102, 104 through a browser or similar type of software application. In certain embodiments, email system 110 may be incorporated into a client 102, 104, and in other embodiments it may be separate from client 102, 104, and connected to client 102, 104 via a network, such as network 120. In certain aspects, email system 110 may be a system that provides other functionalities in addition to the email functionalities disclosed herein.

Email system 110 may be configured to execute software that performs processes consistent with the disclosed embodiments. For example, email system 110 may perform one or more processes that intercept, receive, and/or control access to emails, attachments, documents, folders of documents, or any other content associated with emails. Email system 110 may also perform processes that enable clients 102, 104 (or their users) to send, receive, save, store, archive, and the like, emails, attachments, documents, folders of documents, or other content over network 120. In certain disclosed embodiments, email system 110 may also provide attachment management operations, such as PDF conversion, binding, reordering of attachments, renaming of attachments, division of attachments into one or more additional attachments, division of attachments into one or more additional emails, Bates-numbering, cover-page insertion, separator sheet insertion, creating access rights, content viewing, editing, collaboration, redacting, approving, comparing, cleaning metadata, reporting, and/or administrative applications, calendar, and security functions.

Inbound metadata system 112 may be a system that provides metadata cleaning services, as well as email functions, applications, and other types of services consistent with the disclosed embodiments. In certain disclosed embodiments, inbound metadata system 112 may be a computer system connected to client 102, email system 110, and/or client 104 over network 120. In one example, inbound metadata system 112 may include one or more computer or data processing devices that have hardware, software, and/or firmware. Inbound metadata system 112 may also include one or more memory devices, such as local or networked memory storage media, shared memory platforms, or a combination thereof. In certain embodiments, inbound metadata system 112 may be incorporated into a client 102, 104 and/or email system 110, and in other embodiments it may be separate from client 102, 104 and/or email system 110 and connected to client 102, 104 and/or email system 110 via a network, such as network 120.

Figure 1B:
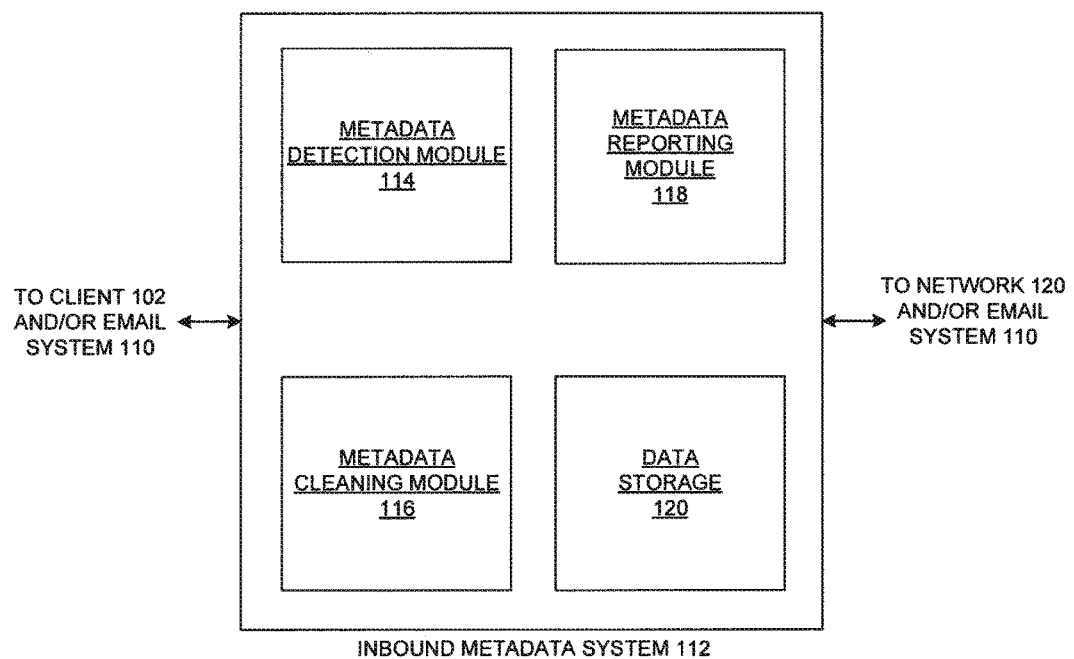
FIG. 1B is a diagram illustrating an exemplary inbound metadata system consistent with disclosed embodiments.

FIG. 1B is a block diagram illustrating an exemplary inbound metadata system 112 consistent with the disclosed embodiments. Inbound metadata system 112 may include a metadata detection module 114, which may forensically analyze email attachments to determine their file types, and to detect and identify the types of metadata (e.g., descriptive, structural, administrative, macros, VBA code, etc.) contained in attachments. Consistent with the disclosed embodiments, an administrator of inbound metadata system 112 or client 102 may configure metadata detection module 114 to detect metadata based on a list of predetermined types of metadata, or based on categories of metadata as described herein. Inbound metadata system 112 may also include a metadata cleaning module 116, which may remove a portion of detected metadata in an attachment, or remove the entirety of the detected metadata in an attachment. For example, an administrator of inbound metadata system 112 or client 102 may configure metadata cleaning module 116 to clean certain predetermined types of metadata, or to remove all detected metadata from attachments. Inbound metadata system 112 may additionally include a metadata reporting module 118, which may generate reports for sending to, e.g., client 102, describing the types of metadata detected in email attachments, providing options for analyzing and/or cleaning metadata detected in email attachments, or describing types of metadata cleaned from email attachments. Metadata reporting module 118 may also generate alerts to, e.g., client 102, when metadata is detected, analyzed, and/or cleaned in an email attachment. Inbound metadata system 112 may further include a data storage 120, where inbound metadata system 112 may store and/or queue intercepted emails and attachments for metadata detection, analysis, reporting, and/or removal, and to quarantine emails and/or attachments that contain metadata that cannot be removed.

Inbound metadata system 112 may be configured to execute software that performs processes consistent with the disclosed embodiments. For example, inbound metadata system 112 may intercept and/or control access to electronic messages (e.g., emails), attachments, documents folders of documents, or any other content associated with emails. Inbound metadata system 112 may also perform processes to analyze emails, attachments, documents, folders of documents, or any other content associated with emails for metadata and to detect, prepare & send reports to recipient, clean and remove such metadata. In certain embodiments, inbound metadata system 112 may be configured to intercept inbound emails sent to client 102 and analyze and clean metadata from attachments to such inbound emails. In certain disclosed embodiments, inbound metadata system 112 may be configured (e.g., by an email recipient operating client 102 and/or an email sender operating client 104) to clean predetermined types of metadata from attachments. Inbound metadata system 112 may also be configured to determine the file type of an attachment to an email and the origin of the email, such as the sender's email address or IP address. Consistent with the disclosed embodiments, inbound metadata system 112 may be a system that provides other functionalities in addition to the metadata cleaning and other email functionalities expressly described herein.

Returning to FIG. 1A, consistent with the disclosed embodiments, email system 110 and/or inbound metadata system 112 may be associated with an email recipient operating client 102. For example, email system 110 may comprise an email exchange server that provides email services to a client 102 within a local or wide area network. In certain embodiments, email system 110 may reside within or on a firewall of an organization, company, or other entity including a client 102 receiving an inbound email. Similarly, inbound metadata system 112 may be associated with an email recipient operating client 102 and may also reside within or on a firewall of an organization, company, or other entity that includes client 102. In certain embodiments, inbound metadata system 112 may be implemented as a system within email system 110. In other embodiments, inbound metadata system 112 may be an intermediate computer system between client 102 and email system 110, and in still other embodiments, inbound metadata system 112 may reside outside of both client 102 and email system 110, on the one hand, and inside of client 104, on the other hand. When an email sender operating client 104 sends an email over network 120 to a recipient operating client 102, email system 110 and/or inbound metadata system 112 associated with client 102 may intercept the email and perform operations consistent with the disclosed embodiments on the email and any email attachments before permitting the email to continue to client 102. In certain disclosed embodiments, inbound metadata system 112 may analyze the email for attachments, determine the file type of attachments, analyze attachments for metadata, clean metadata from attachments, prepare and send reports regarding metadata in attachments, generate alerts regarding metadata in attachments, quarantine emails and/or attachments, and permit emails and attachments to proceed to email system 110 and/or client 102. In other embodiments, inbound metadata system 112 may receive or intercept an email from email system 110 and perform similar operations on the email and/or attachment before permitting it to proceed to client 102.

Figure 2:
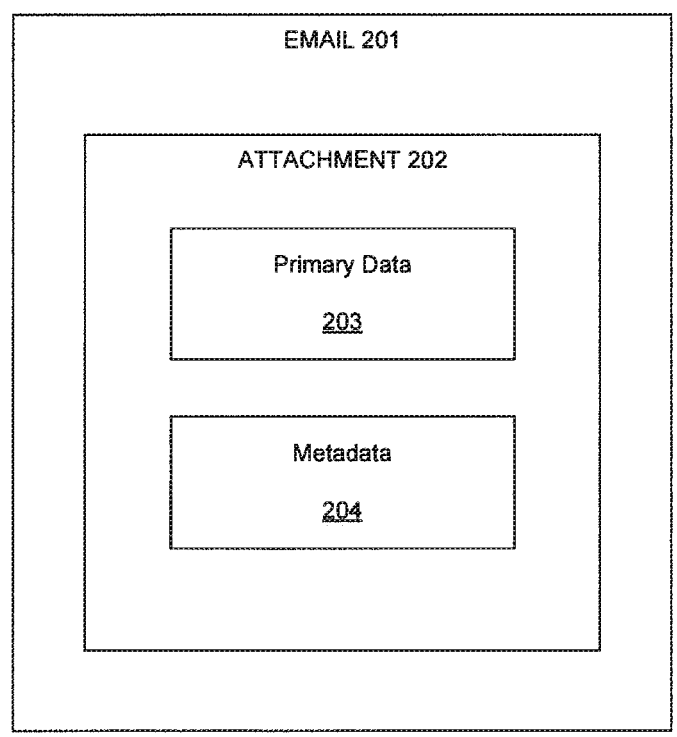
FIG. 2 is a diagram illustrating an exemplary electronic message reflecting certain aspects consistent with disclosed embodiments.

FIG. 2 is a diagram illustrating an exemplary electronic message 201 consistent with the disclosed embodiments. In certain embodiments, email 201 may contain an attachment 202. An attachment 202 may be selected from any type of file, such as a document, a spreadsheet, a text file, an image, a database, a temporary buffer, a web-page, an email, a worksheet, a .PDF, .DOC, .EXE, .PPTX or .XLS file, or any other type of file or structure used to store information. An attachment 202 may also be a folder or sub-folder containing one or more files, or a combination of one or more files, including but not limited to bound files, merged files (e.g., PDFs), .ZIP and other types of files. An attachment may be a file created, reviewed, revised, edited, or otherwise modified by a user operating an application or other software at client 102, 104. In certain aspects, an attachment 202 may also have certain access or security rights associated with it (e.g., read-only, edit-only, comment-only, confidential, highly confidential, etc.). The above-listed examples of attachments are not intended to be limiting of the scope of the disclosed embodiments.

Consistent with the disclosed embodiments, an attachment 202 may contain primary data 203 and metadata 204. For example, primary data 203 may comprise the information content of attachment 202, including text, objects, figures, images, formatting data, font data, page-break data, paragraph separation and format, text size and type, and the like. Metadata 204 may include, for example, information that is not primary data 203 or information not immediately apparent to a user operating client 102, 104 in an attachment 202. Consistent with certain embodiments, metadata 204 may include information that describes attributes of an attachment. For example, descriptive metadata may include data concerning the author or creator of an attachment 202, the original file name of the attachment 202, the time and date that attachment 202 was created and/or modified, indications that the content of attachment 202 has been modified (e.g., comments and redline edits), and version or editing history information for attachment 202, including user identifications, edits, and editing times. Metadata may also include structural metadata relating to the components of an attachment and relationships between them. Metadata may further include administrative metadata relating to, e.g., collaboration attributes or access rights for reviewing an attachment or performing operations on an attachment (e.g., reviewing, edits, approving, comparing, transmitting, etc.). Metadata may also include other information contained within an attachment 202, such as macros, VBA variables, and/or other executable code within an electronic document. As used herein with respect to the disclosed embodiments, the term "metadata" does not include viruses, although certain disclosed embodiments may provide for the analysis and removal of both metadata and viruses.

In certain embodiments, email 201 may be an email sent from the address of a user operating client 104 to the address of a recipient operating client 102. In other embodiments, email 201 may similarly be sent by a user operating client 102 and received at a recipient operating client 104. Email 201 may also intercepted by email system 110 and/or inbound metadata system 112 before it is received at client 102, 104. Upon intercepting an email 201, email system 110 and/or inbound metadata system 112 may perform operations on the email 201 and/or attachment 202 consistent with the disclosed embodiments. Once email system 110 and/or inbound metadata system 112 performs operations on an email 201 and/or attachment 202, email system 110 and/or inbound metadata system 112 may send, forward, or otherwise permit email 201 to proceed to a recipient operating, e.g., client 102.

Figure 3:
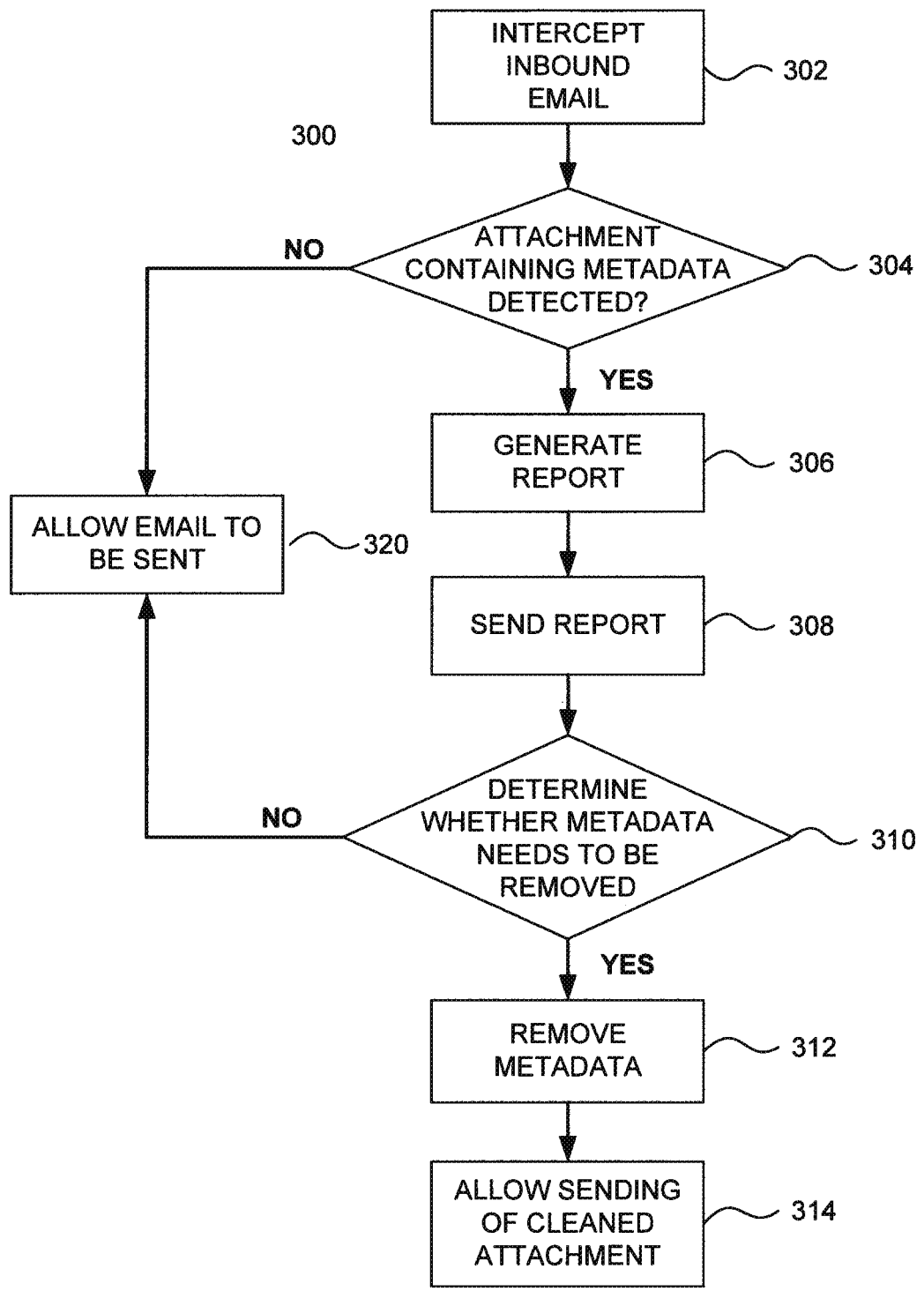
FIG. 3 is a flowchart illustrating an exemplary inbound email attachment process consistent with disclosed embodiments.

FIG. 3 is a flowchart illustrating an exemplary inbound metadata detection, cleaning, and reporting cleaning process 300 consistent with certain disclosed embodiments. Each step of process 300 may be performed by one or more of client 102, by email system 110, and/or by inbound metadata system 112. While process 300 is described herein with respect to certain embodiments, process 300 is not limited to such a configuration of components of system 100 and to such a distribution of operations, as different combinations of components and operations may similarly be used to perform the steps of process 300.

In certain disclosed embodiments, an inbound metadata system 112 associated with client 102 may intercept an inbound email 201 designating client 102 as a recipient (step 302). For example, email 201 may designate client 104 as the sender, and inbound metadata system 112 may receive inbound email 201 over network 120 before it arrives to either client 102 or email system 110. In other embodiments, email system 110 may receive email 201 over network 120 from client 104, and may permit it to proceed to inbound metadata system 112.

In step 304, inbound metadata system 112 may analyze any attachments 202 to email 201 for metadata. In certain embodiments, inbound metadata system 112 associated with client 102 may analyze an attachment 202 for predetermined types of metadata 204 according to a metadata cleaning policy designated by client 102. In other embodiments, inbound metadata system 112 may be configured to detect specific types of metadata. If, at step 304, inbound metadata system 112 detects no metadata associated with an attachment 202 to email 201, it may allow the email 201 and attachment to be sent onwards to client 102 and/or email system 110 in step 320.

If, however, inbound metadata system 112 detects metadata associated with an attachment 202 to email 201, inbound metadata system 112 may generate a report describing, e.g., the detected metadata, the file type of the attachment, and options for analyzing or cleaning the metadata (step 306). At step 308, inbound metadata system 112 may send the report to a recipient operating client 102 or to a designated administrator of system 112.

At step 310, inbound metadata system 112 may determine whether the metadata needs to be cleaned or removed. In one embodiment, inbound metadata system 112 may perform operations to remove or retain metadata in response to instructions received from client 102 or an administrator after analyzing the report sent in step 308. In certain disclosed embodiments, inbound metadata system 112 associated with client 102 may determine whether metadata associated with an attachment 202 matches a predetermined type of metadata for cleaning or removal according to a metadata cleaning policy designated by client 102 or an administrator. In other embodiments, inbound metadata system 112 may be configured to determine whether specific types or prevalence of metadata needs to be removed. If inbound metadata system 112 determines that metadata does not need to be removed, it may allow the email 201 and attachment to be sent onwards to client 102 and/or email system 110 in step 320.

If inbound metadata system 112 determines that metadata needs to be removed, process 300 may proceed to step 312. At step 312, inbound metadata system 112 may clean or remove metadata from the attachment 202 to email 201. At step 314, inbound metadata system 112 may allow sending of email 201 with the cleaned attachment towards client 102 either directly or indirectly (e.g., via email system 110).

Figure 4:
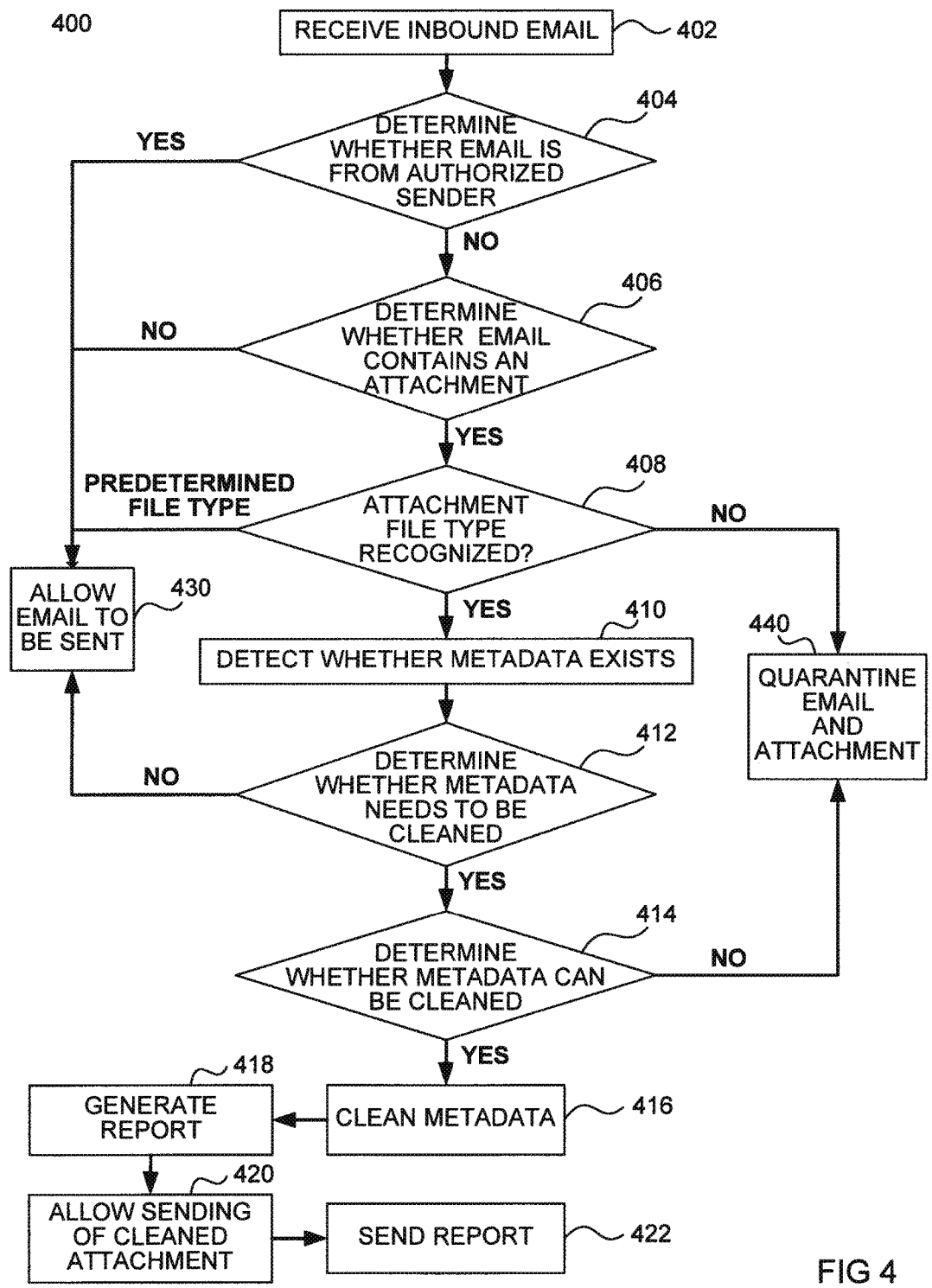
FIG. 4 is a flowchart illustrating an exemplary inbound email attachment process consistent with disclosed embodiments.

FIG. 4 is a flowchart illustrating another exemplary metadata detection, cleaning, and reporting process 400 consistent with certain disclosed embodiments. Each step of process 400 may be performed by one or more of client 102, by email system 110, and/or by inbound metadata system 112. While process 400 is described herein with respect to certain embodiments, process 400 is not limited to such a configuration of components of system 100 or to such a distribution of operations, as different combinations of components and operations may be used to perform the steps of process 400.

In one embodiment, inbound metadata system 112 associated with client 102 may receive an inbound electronic message 201 (e.g., email) designating client 102 as recipient (step 402). In certain embodiments, a user operating client 104 may be a sender of email 201, and inbound metadata system 112 may receive inbound email 201 over network 120 before it arrives to either client 102 or email system 110. In other embodiments, email system 110 may receive email 201 over network 120 from client 104, and may permit it to proceed and be received or intercepted by inbound metadata system 112. In still other embodiments, email system 110 may receive an email 201, send it to inbound metadata system 112 to perform one or more steps of process 400, after which metadata system 112 may return the email 201 to email system 110 to send to client 102, to perform other steps of process 400, or to perform yet other operations on email 201 and/or its attachments. Inbound metadata system 112 and/or email system 110 may intercept an inbound electronic message 201 by, e.g., recognizing the domain or IP address associated with the designated recipient of the inbound electronic message 201 and temporarily retaining the message 201 to perform one or more steps of process 400.

In step 404, inbound metadata system 112 may determine the origin of the email 201. Consistent with the disclosed embodiments, if inbound metadata system 112 determines that email 201 originated from an authorized sender (e.g., client 104), inbound metadata system 112 may allow email 201 and any attachments to be sent onwards to client 102 and/or email system 110 without further analysis or operations (step 430). If inbound metadata system 112 determines that email 201 did not originate from an authorized sender, it may proceed to perform one or more steps of process 400. In certain disclosed embodiments, inbound metadata system 112 may evaluate, e.g., the email address, IP address, or other credentials associated with the sender of email 201 to determine the origin of email 201 and whether email 201 originated from an authorized sender. Authorized senders may include, e.g., users operating clients (e.g., client 104) within a company, organization, or other entity, or users otherwise designated by client 102 and/or an administrator. Consistent with certain disclosed embodiments, client 102 and/or an administrator may configure inbound metadata system 112 to recognize certain email senders as authorized or unauthorized senders through the use of email exchange accounts, a white list, registration in a directory, and the like.

In step 406, inbound metadata system 112 may determine whether email 201 contains an attachment 202. If email 201 does not contain an attachment, inbound metadata system 112 may allow email 201 to be sent to client 102 and/or email system 110 (step 430). If inbound metadata system 112 determines that email 201 contains an attachment 202, inbound metadata system 112 may recognize or determine the file type of the attachment (step 408). In one embodiment, inbound metadata system 112 may be configured to perform operations to determine the file type of the attachment regardless of the attachment's designated file extension. For example, inbound metadata system 112 may analyze the underlying code of an attachment 202 to determine that an attached document may be an MS Word or Excel file despite having a .PDF extension. In other embodiments, inbound metadata system 112 may determine that an attachment with a .DOC extension is in fact a PDF file. Inbound metadata system 112 may perform still other operations to determine the true file type of an attachment, regardless of whether such attachment has been renamed to provide the appearance of being another file type (e.g., to circumvent security measures).

In certain embodiments, upon determining the file type of an attachment, inbound metadata system 112 may allow the email to be sent to client 102 and/or email system 110 (step 430). In certain disclosed embodiments, inbound metadata system 112 may be configured (e.g., by client 102 or an administrator of a network, organization, or application, etc.) to allow emails having certain predetermined types of documents attached to proceed without further analysis or operations. In other embodiments, if inbound metadata system 112 cannot determine the file type of an attachment 202, inbound metadata system 112 may quarantine the email 201 and/or attachment in step 440.

In step 440, consistent with certain disclosed embodiments, inbound metadata system 112 may store the email 201 and/or attachment 202 for quarantine. In other examples, inbound metadata system 112 may forward email 201 and/or attachment 202 to email system 110 and/or client 102 for quarantine storage. Consistent with the disclosed embodiments, inbound metadata system 112 may enable various operations for the review of emails and/or attachments in quarantine. As one example, inbound metadata system 112 may provide quarantined emails and/or attachments to client 102 or a designated administrator for further review and analysis. In other examples, inbound metadata system 112 may provide for client 102 or a designated administrator to select settings for receiving and reviewing quarantined emails and/or attachments. In still other examples, inbound metadata system 112 may generate a log of quarantined emails and/or attachments and provide the log to client 102 or a designated administrator for review, which may further include options for enabling review and analysis of such quarantined emails and/or attachments. In certain embodiments, inbound metadata system 112 may only quarantine a subset of the attachments to an email 201 and allow the remainder to be sent to client 102 or to proceed through the remaining steps of process 400. In other embodiments, metadata system 112 may quarantine all attachments if one attachment to an email 201 is quarantined, and in other embodiments, inbound metadata system 112 may quarantine both the email 201 and all of its attachments.

If inbound metadata system 112 determines the file type of an attachment 202 to email 201 in step 408, inbound metadata system 112 may proceed to determine whether the attachment 202 contains metadata (step 410). In certain embodiments, inbound metadata system 112 may determine that an attachment to email 201 does not contain any metadata and allow the email 201 and attachment to be sent to client 102 and/or email system 110 (step 430). In other embodiments, inbound metadata system 112 may determine that an attachment contains metadata 204, and proceed to determine whether the metadata 204 needs to be cleaned or removed (step 412). In certain embodiments, inbound metadata system 112 may determine that the metadata matches a predetermined type of metadata (e.g., as configured by client 102 and/or an administrator). In other embodiments, inbound metadata system 112 may be configured to determine whether specific types of metadata need to be removed or that a certain prevalence of metadata exists (e.g., a ratio of metadata to primary data) and needs to be removed.

If inbound metadata system 112 determines that the metadata does not need to be cleaned, it may allow the email 201 and its attachment to be sent to client 102 and/or email system 110 (step 430) without further operations or analysis. In other embodiments, inbound metadata system 112 may determine that the metadata needs to be cleaned and proceed determine whether the metadata can be cleaned from the attachment (step 414). If inbound metadata system 112 determines that it cannot clean the metadata from the attachment, process 400 may proceed to step 440 and inbound metadata system 112 may quarantine the email and/or attachment. If inbound metadata system 112 determines that it can clean all or a portion of the metadata, it may automatically clean the metadata (or at least a portion of the metadata) from the attachment (step 416). In step 416, in certain embodiments, inbound metadata system 112 may remove the metadata from the attachment to email 201. In other embodiments, inbound metadata system 112 may also generate a cleansed version of an attachment to email 201 and replace the original attachment to email 201 with the cleansed version.

In step 418, inbound metadata system 112 may generate a report that may describe, e.g., the file type of attachment 202, the types of metadata detected in attachment 202, the metadata cleaned from attachment 202, the metadata remaining in attachment 202, and/or whether any quarantine of the email 201 or attachment 202 may be necessary. In other embodiments, inbound metadata system 112 may generate a report that also provides options to a recipient operating client 102 or to an administrator regarding, e.g., whether certain types of metadata should be removed from an attachment 202, or whether portions or all of an attachment should be quarantined.

At step 420, inbound metadata system 112 may proceed to allow sending of the email 201 and cleaned attachment to client 102 and/or email system 110. In certain embodiments, inbound metadata system 112 may analyze the email 201 to determine the next hop (e.g., by IP address or domain) and accordingly send the email 201 onwards to the next hop, e.g., to email server 110 or client 102. In step 422, inbound metadata system 112 may also send the report generated in step 418 to either client 102 or an administrator. In certain embodiments, inbound metadata system may generate and send a unique report for each email 201 and/or attachment 202. In other disclosed embodiments, inbound metadata system may generate a log accessible by client 102 or an administrator with entries corresponding to particular emails 201 and attachments 202. For example, rather than creating and sending a unique report, inbound metadata system may populate an entry in the log for an attachment 202 containing similar information as a unique report would, and generate a notification to a recipient operating client 102 and/or an administrator that the log has been updated.

Variations on process 400 and rearrangements and reordering of one or more steps may occur without departing from the spirit of the disclosed embodiments. For example, among other possible reorderings of steps, process 400 may begin at step 404 instead of step 402, and vice versa. Non-dependent steps may be performed in any order, or in parallel. In other examples, process 400 may generate and send a report (steps 418 and 422) before cleaning metadata (step 416), or before allowing sending of a cleaned attachment (step 420). In other disclosed embodiments, process 400 may omit certain steps or include additional steps as may be apparent from the embodiments disclosed herein.

Figure 5:
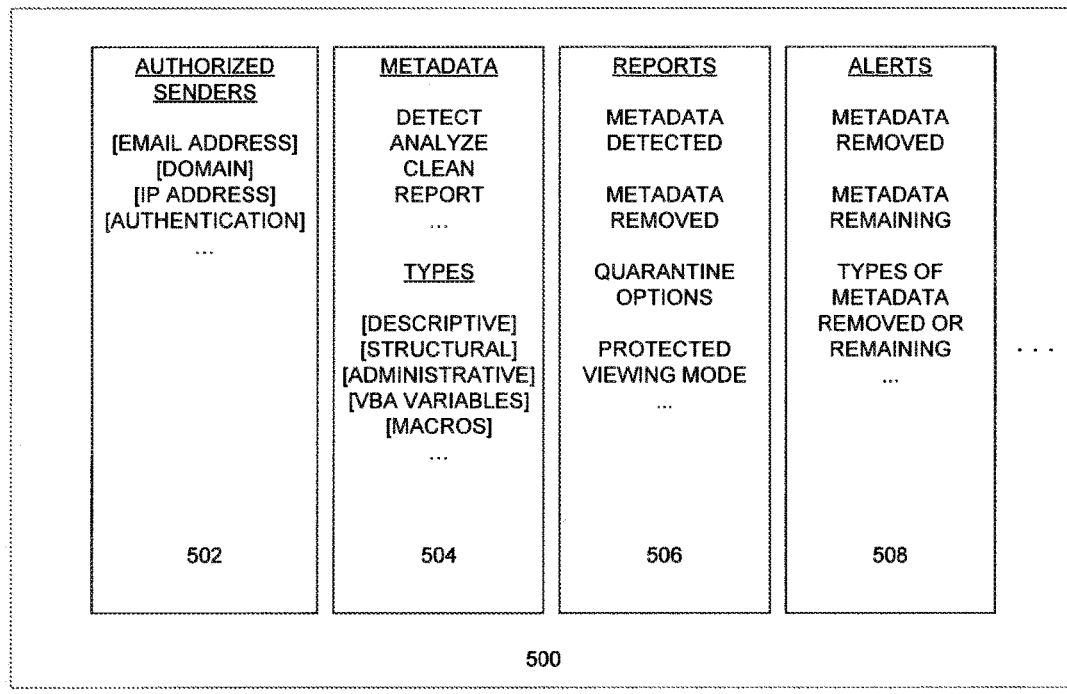
FIG. 5 is a diagram illustrating an exemplary interface reflecting certain aspects consistent with disclosed embodiments.

One or more components of system 100 may perform additional operations specific to one or more aspects of the disclosed embodiments. For example, FIG. 5 is a diagram illustrating an exemplary interface 500 consistent with the disclosed embodiments. One or more components of system 100 may provide for an interface 500 for a user operating client 102 to configure inbound metadata system 112 to perform certain functionalities, which may be related to one more steps of processes 300 or 400. The one more components of system 100 may provide interface 500 within a standalone program or application, or as a menu or table associated with an application or email platform (e.g., MS Outlook, Gmail, Hotmail, etc.)

Consistent with the disclosed embodiments, interface 500 may provide a menu, table, or listing of selectable options 502 for a user operating client 102 to configure inbound metadata system 112 to recognize certain authorized senders or domains of senders according to designated email addresses, IP addresses, or other security criteria (e.g., authentication keys, logins and passwords, etc.) In other embodiments, interface 500 may provide a menu, table, or listing of selectable options 504 for a user operating client 102 to determine particular types of metadata (e.g., VBA variables, editing identifiers, version history, etc.) to detect, analyze, report, and/or clean.

Interface 500 may additionally provide a menu, table, or listing of selectable options 506 for a user operating client 102 to provide for the generation of reports and the review of quarantined emails and/or attachments. In certain examples, a user operating client 102 may configure inbound metadata system 112 to generate a report or update an existing report to describe, e.g., the metadata detected and/or cleaned from an attachment 202. In certain examples, a user operating client 102 may also configure inbound metadata system 112 to generate a log of quarantined emails and attachments along with their detectable attributes (e.g., file type, sender address or identity, metadata, etc.) and provide the log to client 102 and/or a designated administrator for review. In other examples, a user operating client 102 may configure inbound metadata system 112 to enable the review of quarantined emails and/or attachments at client 102 within a protected mode, such as opening the emails and attachments while deactivating any executable code within such attachments, or by opening the emails and attachments within a virtual memory at inbound metadata system 112 and temporarily rendering them for display to a user operating client 102.

In yet additional embodiments, interface 500 may provide a menu, table, or listing of selectable options 508 for a user operating client 102 to configure inbound metadata system 112 to generate an alert, e.g., if an incoming email contains an attachment that includes metadata or if inbound metadata system 112 cleaned certain metadata in accordance with certain disclosed embodiments. Similarly, inbound metadata system 112 may be configured to generate an alert if an intercepted email contained an attachment that could not be analyzed or cleaned, and to communicate the reason why the attachment could not be analyzed or cleaned (e.g., "This inbound file could not be cleaned of macros." or "This inbound file type could not be determined."). In yet other embodiments, interface 500 may provide options for a user operating client 102 to configure inbound metadata system 112 to perform similar metadata cleaning operations on both inbound and outbound emails and attachments.

Other aspects of the disclosed embodiments will be apparent to those skilled in the art from consideration of the specification and practice of the disclosed embodiments disclosed herein. It is intended that the specification and examples be considered as exemplary only, with particular examples of the disclosed embodiments being indicated by the following claims.

What is claimed is:

1. A computer-based system for cleaning metadata from inbound attachments, comprising:
    an intermediate computer that is associated with a client device operated by an electronic message recipient, the intermediate computer comprising:
    a memory storing instructions; and
    one or more processors configured to execute the instructions to:
        intercept an inbound electronic message sent to the recipient,
        determine that an electronic document attached to the inbound electronic message includes metadata,
        create a modified electronic document by removing at least a portion of the metadata from the attached electronic document,
        generate a report describing metadata included in the attached electronic document, and
        generate information for sending the report and the inbound electronic message with the modified electronic document to the client device.

2. The system of claim 1, wherein the one or more processors are further configured to execute the instructions to;
    determine that at least a portion of the metadata from the attached electronic document cannot be removed, and
    send the attached electronic document to a quarantine storage.

3. The system of claim 2, wherein the one or ore processors are further configured to execute the instructions to:
    generate an entry in a log including an identification of the attached electronic document and an indication that at least a portion of the metadata from the attached electronic document could not be removed; and
    provide the log to the client device.

4. The system of claim 1, wherein the one or more processors are further configured to execute the instructions to intercept the inbound electronic message from an intermediate email server associated with the client device.

5. The system of claim 1, wherein the one or more processors are further configured to execute the instructions to send the inbound electronic message with the modified electronic document to an intermediate email server associated with the client device.

6. The system of claim 1, wherein the removed portion of the metadata includes descriptive metadata or administrative metadata.

7. The system of claim 1, wherein the descriptive metadata includes author data, editing history, or an indication of modified content in the attached electronic document.

8. A computer-based method for cleaning metadata from inbound attachments, comprising:
    intercepting, at an intermediate computer that is associated with a client device operated by an electronic message recipient, an inbound electronic message sent to the recipient,
    determining that an electronic document attached to the inbound electronic message includes metadata,
    creating a modified electronic document by removing at least a portion of the metadata from the attached electronic document,
    generating a report describing metadata included in the attached electronic document, and
    generating information for sending the report and the electronic inbound message with the modified electronic document to the client device.

9. The method of claim 8, further comprising:
    determining that at least a portion of the metadata from the attached electronic document cannot be removed, and
    sending the attached electronic document to a quarantine storage.

10. The method of claim 9, further comprising:
    generating an entry in a log including an identification of the attached electronic document and an indication that at least a portion of the metadata from the attached electronic document could not be removed; and
    providing the log to the client device.

11. The method of claim 8, further comprising intercepting the inbound electronic message from an intermediate email server associated with the client device.

12. The method of claim 8, further comprising sending the inbound electronic message with the modified electronic document to an intermediate email server associated with the client device.

13. The method of claim 8, wherein the removed portion of the metadata includes descriptive metadata or administrative metadata.

14. The method of claim 8, wherein the descriptive metadata includes author data, editing history, or an indication of modified content in the attached electronic document.

15. A non-transitory computer-readable storage medium storing instructions for cleaning metadata from inbound attachments, the instructions causing one or more computer processors to perform operations comprising:
   intercepting, at an intermediate computer that is associated with a client device operated by an electronic message recipient, an inbound electronic message sent to the recipient,
   determining that an electronic document attached to the inbound electronic message includes metadata,
   creating a modified electronic document by removing at least a portion of the metadata from the attached electronic document,
   generating a report describing metadata included in the attached electronic document, and
   generating information for sending the report and the electronic inbound message with the modified electronic document to the client device.

16. The storage medium of claim 15, wherein the instructions cause the one or more processors to further perform the operations of:
   determining that at least a portion of the metadata from the attached electronic document cannot be removed, and
   sending the attached electronic document to a quarantine storage.

17. The storage medium of claim 16, wherein the instructions cause the one or more processors to further perform the operations of:
   generating an entry in a log including an identification of the attached electronic document and an indication that at least a portion of the metadata from the attached electronic document could not be removed; and
   providing the log to the client device.

18. The storage medium of claim 15, wherein the instructions cause the one or more processors to further perform the operations of intercepting the inbound electronic message from an intermediate email server associated with the client device.

19. The storage medium of claim 15, wherein the instructions cause the one or more processors to further perform the operations of sending the inbound electronic message with the modified electronic document to an intermediate email server associated with the client device.

20. The storage medium of claim 15, wherein the removed portion of the metadata includes descriptive metadata comprising author data, editing history, or an indication of modified content in the attached electronic document.

* * * * *

UNITED STATES PATENT AND TRADEMARK OFFICE
CERTIFICATE OF CORRECTION

PATENT NO. : 10,536,408 B2
APPLICATION NO. : 14/856285
DATED : January 14, 2020
INVENTOR(S) : Deepak Massand Page 1 of 1

It is certified that error appears in the above-identified patent and that said Letters Patent is hereby corrected as shown below:

Claim 3, Column 14, Line 8, "one or ore" should read --one or more--.

Signed and Sealed this
Third Day of March, 2020

Andrei Iancu
*Director of the United States Patent and Trademark Office*